United States Patent
Nitta et al.

[11] 3,748,074
[45] July 24, 1973

[54] APPARATUS FOR PLASTICIZING THERMOPLASTIC SYNTHETIC RESIN

[76] Inventors: Haruo Nitta; Natoshi Sagawa; Hideo Enjoji; Kakuo Niwa; Shinji Kume, all of Toho-cho, Yokkaichi-shi, Mie-ken, Japan

[22] Filed: Oct. 13, 1970

[21] Appl. No.: 80,427

[30] Foreign Application Priority Data
Oct. 17, 1969 Japan................................ 44/82766
Nov. 18, 1969 Japan................................ 44/91788
Feb. 23, 1970 Japan................................ 45/14983
Feb. 24, 1970 Japan................................ 45/15209

[52] U.S. Cl................ 425/207, 425/376, 425/381.2
[51] Int. Cl.............................................. B29b 1/04
[58] Field of Search................ 18/12 C, 12 A, 12 R, 18/14 R, 14 G, 14 RR, 8 V, 13 RR; 425/207, 381.2, 376

[56] References Cited
UNITED STATES PATENTS
| | | | |
|---|---|---|---|
| 3,051,989 | 8/1962 | Mercer............................... | 18/14 RR |
| 3,122,788 | 3/1964 | Lieberman..................... | 18/12 C UX |
| 2,779,970 | 2/1957 | Stocker......................... | 18/3 RR UX |
| 2,913,763 | 11/1959 | Longstreth et al........... | 18/12 R UX |
| 3,254,365 | 6/1966 | Scoggin............................ | 18/12 A X |
| 3,025,565 | 3/1962 | Doriat et al..................... | 425/381.2 |
| 3,295,165 | 1/1967 | Wallace........................... | 425/381.2 |
| 3,364,522 | 1/1968 | Ledoux............................ | 425/381.2 |

FOREIGN PATENTS OR APPLICATIONS
1,224,472 6/1966 Germany.......................... 18/14 RR
1,911,006 8/1970 Germany............................ 18/14 R

*Primary Examiner*—H. A. Kilby, Jr.
*Attorney*—McGlew and Toren

[57] ABSTRACT

Apparatus for plasticizing continuously resin material or wastes of used synthetic resin formed articles as much as possible. The apparatus does not consume so large energy for its extremely large plasticizing capacity, and moreover, it will not cause a cutting of resin molecules nor deterioration of the resin during the plasticizing operation contrary to the case as in the conventional screw extruder.

The apparatus comprises a rotating member having a frusto-conical inner peripheral wall along which the resin material is propelled longitudinally by centrifugal force from a small diameter to a large diameter portion during the plasticizing process. A cone shaped inner member mounted to rotate with said rotating member may be provided to form a flow passage between said inner peripheral wall and the outer surface of said cone member.

5 Claims, 44 Drawing Figures

Patented July 24, 1973
3,748,074
11 Sheets-Sheet 1
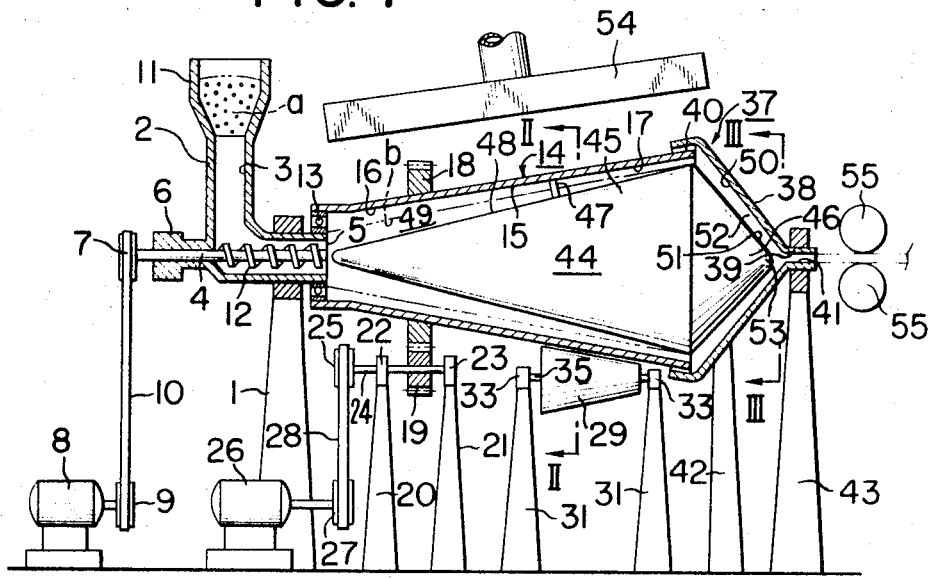
FIG. 1
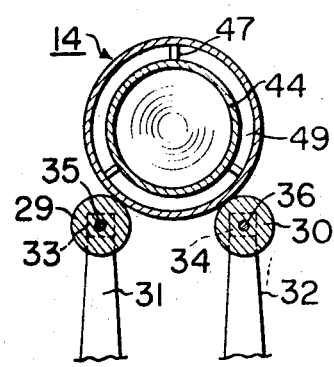
FIG. 2
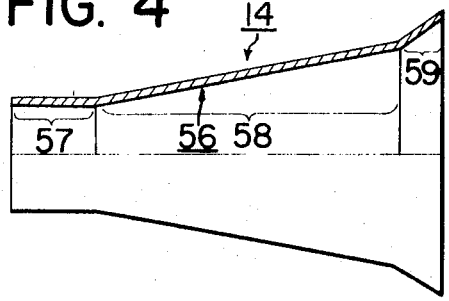
FIG. 3
FIG. 4
INVENTORS
HARUO NITTA
NAOTOSHI SAGAWA
HIDEO ENJOJI
KAKUO NIWA
SHINJI KUME
BY McGlew and Toren
ATTORNEYS Patented July 24, 1973 3,748,074

INVENTORS
HARUO NITTA
NAOTOSHI SAGAWA
HIDEO ENJOJI
BY KAKUO NIWA
SHINJI KUME
ATTORNEYS

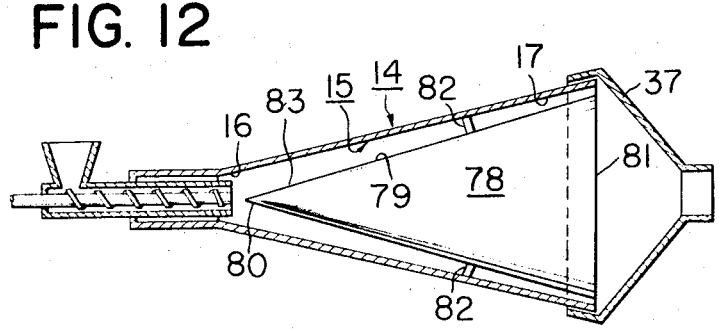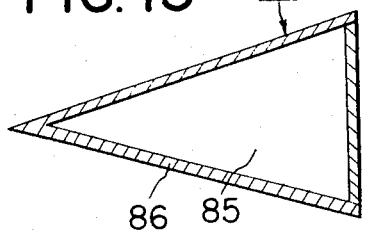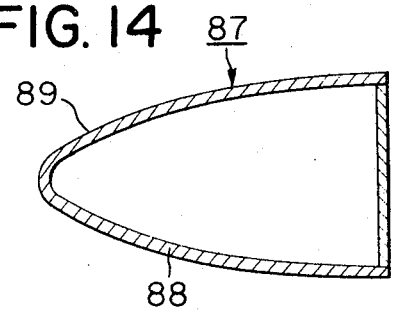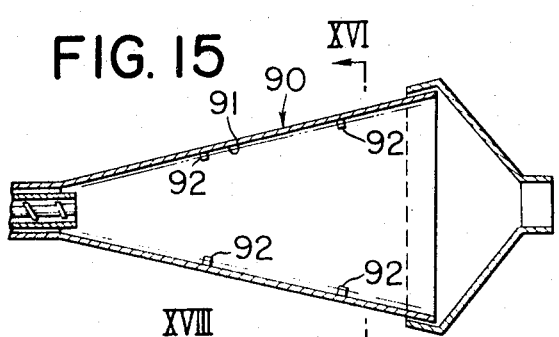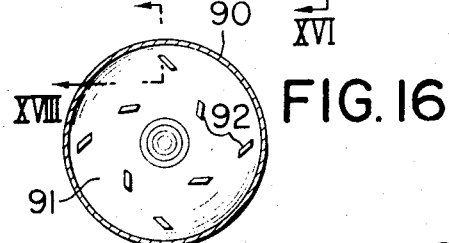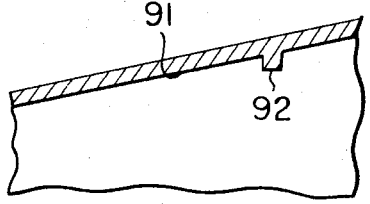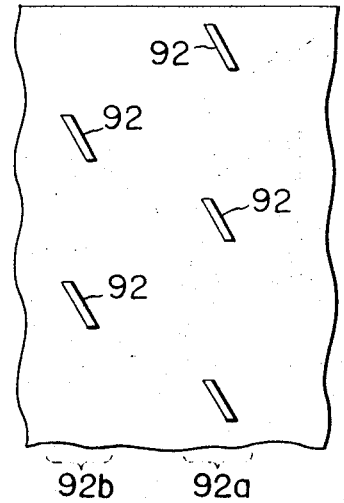

Patented July 24, 1973

INVENTORS
HARUO NITTA
NAOTOSHI SAGAWA
HIDEO ENJOJI
KAKUO NIWA
SHINJI KUME

BY McGlew and Toren
ATTORNEYS

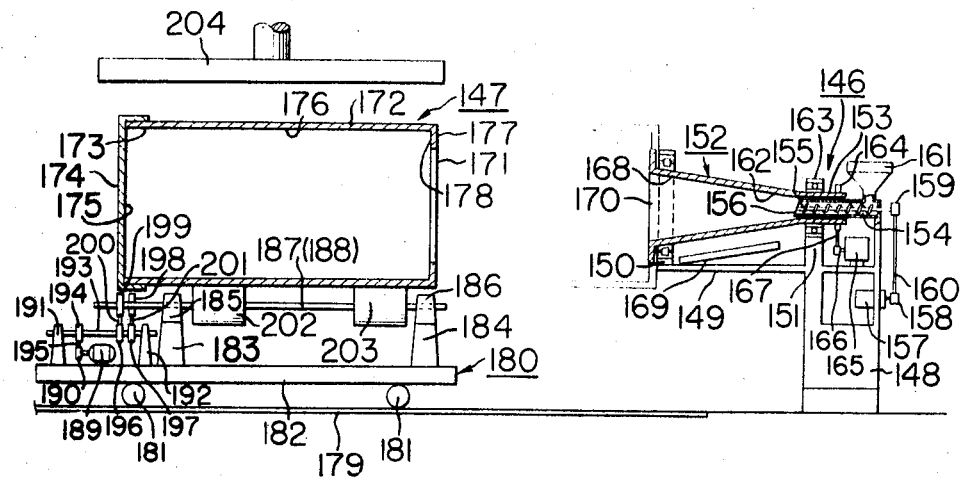
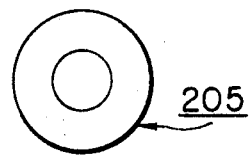
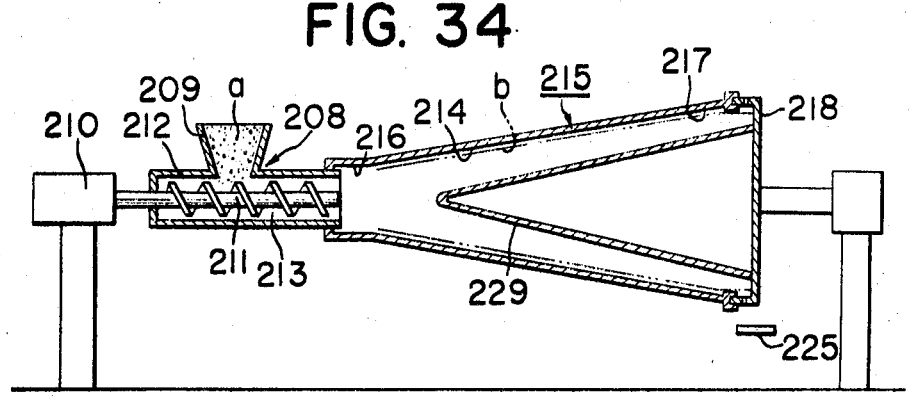

Patented July 24, 1973 3,748,074

INVENTORS
HARUO NITTA
NAOTOSHI SAGAWA
HIDEO ENJOJI
KAKUO NIWA
SHINJI KUME

BY McGlew and Toren
ATTORNEYS

Patented July 24, 1973

INVENTORS
HARUO NITTA
NAOTOSHI SAGAWA
HIDEO ENJOJI
KAZUO NIWA
SHINJI KUME

BY

*McGrew and Toren*
ATTORNEYS

APPARATUS FOR PLASTICIZING THERMOPLASTIC SYNTHETIC RESIN

BACKGROUND OF THE INVENTION

In general, an extruder which extrudes synthetic resin by softening and kneading the synthetic resin therein is functioned to introduce synthetic resin material into a barrel through a hopper, to knead the resin in the barrel by means of a rotating screw as well as to heat it from the outside, and to extrude the melted resin through a discharge mouth piece. In this method, in order to increase the plasticizing efficiency, a breaker plate or the like is provided to control the flow of the melted resin and the back pressure in the barrel is increased thereby to improve the kneading action to carry out the plasticization of the resin. As a result, molecular cutting of the kneaded resin is incurred by the shearing, whereby the resin is deteriorated. Further, there are needed a quantity of heat for the plasticization and a great mechanical energy for the kneading; a great energy being required for the capacity of the plasticization thereof. Moreover, the deaeration and viscosity adjustment thereof are very difficult. Therefore, in the conventional method, there have been such various drawbacks as the capacity of plasticization is small for its large apparatus being required.

Recently, in accordance with the increase of synthetic resin products, the wastes of used synthetic resin molded products have also been remarkably increased. These wastes have been compelled to be buried into the earth or to be destroyed by fire together with other wastes such as papers, woods, glasses, tin-plates, and porcelain. However, in the case where these wastes are buried into the earth the treatment of such wastes as synthetic resin products becomes difficult as these are not weathered nor decomposed and further there is also trouble in destroying them by fire.

Heretofore, the plasticization of synthetic resin has been carried out by the so-called extruder wherein resin as a raw material is fed into a cylinder barrel which is heated from the outside, and then the material is further kneaded and melted in said barrel by means of a screw which is rotated. The plasticizing method such as mentioned above is not suitable when the wastes of synthetic resin products which have extremely different shapes in their sizes are melted and plasticized. Further, when the plasticization is intended to be carried out by said method, the pre-treatment such as pulverization of said wastes is required for forming them into a pellet form. At the same time, separation of substances such as sand and the like contained in the synthetic resin must be carried out. In said process, it is very difficult to pulverize and crush film-formed products and box-shaped products. In order to overcome said disadvantages, there is a method wherein plasticization is carried out within a vessel having agitating blades. However, in said method, there are such disadvantages that the operation of the agitating blades becomes unsmooth as the viscosity of the plasticized melted resin is considerably high and that the plasticizing efficiency thereof is low as the thermal conductivity is extremely low, thus this method is unsuitable for practical use.

This invention especially relates to a plasticizing method wherein a large quantity of wastes of synthetic resin products having different sizes, shapes, and thicknesses can be immediately plasticized without any pre-treatment such as pulverization or the like thereby to produce re-molded products.

Hitherto, in case of compounding stabilizers, fillers, reinforcing materials and pigments into resin material and plasticizing them, for example, in case of compounding glass fibers and the like into polyethylene and plasticizing them, the resin material was mixed into the compounding materials by a blender in advance, and this mixture was introduced into an extruder having a heating cylinder within which a screw was provided and then kneaded and melted whereby plasticization was carried out. Therefore, there is such disadvantages that the step for mixing the resin material and the compounding materials and the step for plasticizing this mixture are required separately and that during the treatment such as feeding, the resin material and the compounding materials are separated from each other or the compounding materials are distributed ununiformly.

This invention relates to an apparatus suitable to plasticization of thermoplastic resin, and in particular suitable to plasticizing it while mixing the resin material and the compounding materials.

Furthermore, in the conventional means, synthetic resin pellets were produced by cutting off synthetic resin bars formed by an extruder and then cured by cooling. Accordingly, the conventional means was uneconomical in that the step for extruding and forming synthetic resin bars by an extruder and the step for cutting off the formed synthetic resin bars were required separately and that the pellet producing ability was not so excellent. Whereas, the means according to this invention can apply a plasticizing means which is directly applied to an apparatus for production of synthetic resin material by polymerization to a pellet producing means thereby to carry out closely the plasticizing means and the pellet producing means and also make it possible to produce a large quantity of pellets.

SUMMARY OF THE INVENTION

A primary object of this invention is to provide a novel plasticizing means which has a mass-plasticization ability.

Another object of the invention is to provide a means for plasticizing synthetic resin without employing any screw.

A further object of the invention is to provide a plasticizing means suitable for reproducing consumed or broken formed articles of thermoplastic synthetic resin.

Another object of the invention is to provide a plasticizing means which can directly apply to an apparatus for production of synthetic resin material by polymerization.

Still another object of the invention is to provide a rotary type plasticizing apparatus wherein a resin material is fed on the inner peripheral wall inside a rotating body while heating and rotating said rotating body, which has substantially a frusto-conical inner peripheral wall surface of successively increasing diameter from a small diameter inner peripheral wall portion and then the fed resin material is melted and forwarded by the pressing and propelling force at the inner peripheral wall due to the centrifugal force produced by the rotation of the rotating body, whereby the melted resin is led out from a large diameter inner peripheral wall.

A further object of the invention is to provide a discharge pressure increasing device in the melted resin aggregate discharge member which is attached to a large diameter inner peripheral wall side of the rotating body of said rotary type plasticizing apparatus.

Another object of the invention is to provide a cone-shaped member in the rotating body of said rotary type plasticizing apparatus thereby to make the resin flow to be plasticized smooth.

A further object of the invention is to provide a cone-shaped member in the melted resin aggregate discharge member attached to the rotating body of said rotary type plasticizing apparatus thereby to afford the normal stress effect to melted resin in order to increase the discharge pressure.

Another object of the invention is to afford the kneading effect to the flowing melted resin by providing projections on the inner peripheral wall of the rotating body of said rotary type plasticizing apparatus.

A further object of the invention is to provide a foreign substance removing device on the large diameter inner peripheral wall of the rotating body of said rotary type plasticizing apparatus.

Another object of the invention is to provide a device for preventing leakage of the melted resin in between said rotating body and members connected thereto in said rotary type plasticizing apparatus.

A further object of the invention is to provide a device for preventing stay of the melted resin by making the melted resin flow smoothly so as to pass forwardly along the inner peripheral wall of the rotating body of said rotary type plasticizing apparatus.

Another object of the invention is to provide a plasticizing means wherein the waste or consumed thermoplastic synthetic resin formed articles are charged into the heated rotating body having the frusto-conical inner peripheral wall surface, said waste or consumed resin formed articles not necessitating any pretreatment such as crushing even though they are synthetic resin formed articles of which size, shape and thickness are different from each other, and said charged materials are pressed to the inner peripheral wall of said rotating body through a guide member and then are melted.

A further object of the invention is to provide a plasticizing means suitable for making plasticization while compounding stabilizers, fillers, reinforcing materials, and pigments into resin material.

Still another object of the invention is to provide an apparatus for producing pellets from the plasticized synthetic resin by cutting the melted resin discharged from the outlet of a leading-out member attached to the large diameter inner peripheral wall of the rotating body of said rotary type plasticizing apparatus.

BRIEF DESCRIPTION OF THE DRAWING

FIG. 1 is a sectional view of the main part of an apparatus to which a plasticizing method of the present invention is applied;

FIG. 2 is a sectional view of the part cut by the line II—II in FIG. 1;

FIG. 3 is a front view of an aggregate discharge member along the line III—III in FIG. 1;

FIG. 4 is a half-part longitudinal sectional view showing the modified embodiment of a rotary body;

FIG. 12 is a sectional view of the rotary type plasticizing apparatus having a conical cone shaped member;

FIGS. 13 and 14 are a sectional views of modified embodiment of the other cone shaped member shown in FIG. 12;

FIG. 15 is a sectional view of the rotary type plasticizing apparatus having a rotating body with projections on its inner peripheral wall;

FIG. 16 is a sectional view of the rotating body viewed along the line XVI—XVI in FIG. 15;

FIG. 17 is a developed plane view of the inner peripheral wall of the rotating body;

FIG. 18 is a partial sectional view of the rotating body viewed along the line XVIII—XVIII in FIG. 16;

FIG. 30 is a sectional view of main part of an apparatus for producing synthetic resin in the case that a plasticizing method of the present invention is applied to the resin formed articles having large thickness.

FIG. 31 is a front view of the end surface of a resin formed article produced by a rotary mold shown in FIG. 30;

FIG. 32 is a front view of the end surface of a piece of said resin formed article cut off in the radial direction with respect to the axial line;

FIG. 33 is a sectional view of a billet produced by cutting-off said piece shown in FIG. 32;

FIG. 34 is a sectional view of the main part of an apparatus for producing synthetic resin pellet to which a plasticizing method of the present invention is applied;

DETAILED DESCRIPTION OF THE INVENTION

Figure 5:
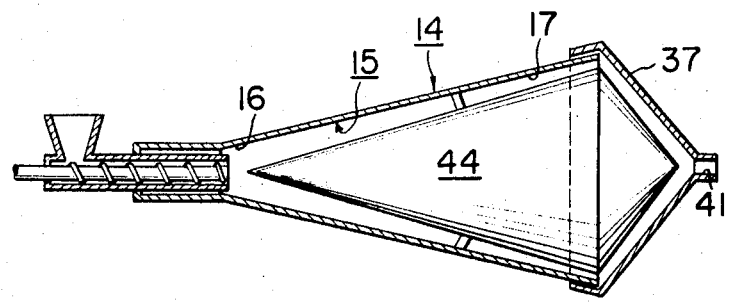
FIG. 5 is a sectional view of a rotary type plasticizing apparatus in FIG. 1.

An example of an apparatus adopting the method of the present invention will now be described referring to FIGS. 1 through 7. There is provided a delivery mechanism 2 supported by a support pedestal 1. The delivery mechanism 2 comprises a flow passage wall 3 and a delivery screw bar 4. The forward end of the delivery screw bar 4 provided within the horizontal portion of the flow passage wall 3 is arranged at the opening 5 of the flow passage wall 3 and then the rear portion thereof is exposed outside the flow passage wall 3 and is supported by a bearing part 6. Further, a chain sprocket wheel 7 is fixedly provided to a part projected from the bearing part 6. A chain 10 is provided between said chain sprocket wheel 7 and a chain sprocket wheel 9 fixed to the shaft of a driving electric motor 8 disposed at an appropriate position. The aforementioned screw bar 4 functions to supply the resin material by transferring it to the right side. The flow passage wall 3 is formed to be L-shape and a hopper 11 is fixedly provided at the upper end of the vertical portion of said flow passage wall 3.

There is provided a rotating body 14 connected to the end of horizontal passage 12 of the flow passage wall 3, the left end of said rotating body 14 being supported rotatably by means of a bearing 13. The rotating body 14 presents an appearance of a bugle shape, and has the diameter in the right end larger than that in the left end. The diameter of an inner peripheral wall 15 is gradually expanded from the left end to the right end, namely, from the small diameter inner peripheral wall 16 toward the large diameter inner peripheral wall 17. Further, a ring gear wheel 18 is fixedly provided on the outer periphery closer to the left end, and the ring gear wheel 18 is engaged with a gear wheel 19. Thus, the gear wheel 19 is fixedly provided on a rotary shaft 24 supported by upper end bearing parts 22, 23 of the support pedestals 20, 21. Then, a chain sprocket wheel 25 is fixed to the rotary shaft 24 which projects from the bearing part 22 and a chain 28 is provided between a chain sprocket wheel 27 securely fixed to the shaft of the driving electric motor 26 disposed at an appropriate position and said chain sprocket wheel 25.

Further, the rotating body 14 is supported by frusto-conical shaped support members 29, 30, thereby to maintain the axial line of the rotating body 14 in the horizontal state. Said support members 29, 30 are respectively fixed to the rotary shafts 35, 36 of which both ends are supported by bearing parts 33, 33, 34, 34 formed at the upper end of support pedestals 31, 32 and the rotary shafts 35, 36 are rotatably supported by the bearing parts 33, 33, 34, 34. A melted resin aggregate discharge member 37 is attached to the end of the large diameter inner peripheral wall 17 of the rotating body 14 and comprises a funnel wall portion 38 and a discharge portion 39. A rotatable sealing mechanism 40 is constituted by the outer periphery of the large diameter inner peripheral wall 17 and the end portion of said aggregate discharge member 37. A discharge passage 41 is formed at the end of the discharge portion 39. Further, said aggregate discharge member 37 is fixedly supported by support pedestals 42, 43.

A cone shaped member 44 is provided in the rotating body 14 and comprises a long conical portion 45 and a short conical portions 46 which has the co-axial line with the long conical portion 45. Said cone shaped member 44 is connected to the rotating body 14 by connecting pieces 47, 47 thereby to integrally rotate. There is formed a circular flow passage 49 by the inner peripheral wall 15 of the rotating body 14 and the outer peripheral surface 48 of the long conical portion 45 of the cone shaped member 44. A circular passage 52 is formed between the inner peripheral surface 50 of the funnel wall portion 38 and the outer surface 51 of the short conical portion 46. In this case, a tip 53 of the short conical portion 46 is directed to the discharge passage 41 and also is positioned on the axial line of the rotating body 14.

The inclined angle of the outer surface 48 of the cone shaped member 44 is larger than that of the inner peripheral wall 15 of the rotating body 14, that is, the circular clearance in the radial direction of the small diameter inner peripheral wall 16 is larger than that of the large diameter inner peripheral wall 17 of the rotating body 14. peripheral wall 17. The circular passage 49 is reduced from the small diameter peripheral wall 16 to the large diameter inner peripheral wall 17 of the rotating body 14.

The rotating body 14 and the core shaped member 44 are aligned on the same axial line.

Further, a heating device 54 is disposed in the neighborhood of the outer periphery of the rotating body 14. Said heating device 54 may be suitably selected from an infrared ray gas burner, electric heater, etc.

The discharge passage 41 of the aggregate discharge member 37 in this example is in the rectangular form as shown in FIG. 3 in order to produce the sheet-like strip. The members shown by the numerals 55, 55 are pinch rollers.

Thus, when a driving electric motor 8 is operated, the delivery screw bar 4 is rotated by means of a chain sprocket wheel 9, chain 10, and chain sprocket wheel 7. Further, when a driving electric motor 26 is operated, a rotary shaft 24 is rotated by means of a chain sprocket wheel 27, chain 28 and chain sprocket wheel 25. Further, the rotating body 14 is rotated by means of a ring gear wheel 18 which engages with the gear wheel 19 fixed to the rotary shaft 24. In this case, since the left end of the rotating body 14 is rotatably supported by the support members 29, 30, the rotating body 14 is rotated in the state that the axial line thereof is maintained in the horizontal direction. Moreover, the cone shaped member 44 is also rotated integrally with the rotating body 14.

Accordingly, the resin material a charged into a hopper 11 is transferred to the horizontal portion from the vertical portion of the flow passage wall 3 by the delivery screw rod 4. Thus, the material a is dropped from the opening 5 of the horizontal portion to the small diameter inner peripheral wall 16.

The material a dropped into the rotating body 14 is rotated in accordance with the rotation of the rotating body 14 so that it may be pressed on the inner peripheral wall 15 of the rotating body 14 with a relatively great force by the centrifugal force due to the rotation of the rotating body 14, and then the material is melted and plasticized since the rotating body 14 is heated by means of the heating device 54.

Thus, the material a which is gradually sent by the screw bar 4 is dropped into the inner peripheral wall 15 of the rotating body 14. However, the resin which was previously pressed against the inner peripheral wall 15 and melted is given the forwarding force by the component of the centrifugal force base on the inclined plane of the inner peripheral wall 15 to be continuously forced in the right direction along the inner peripheral wall 15 of the rotating body 14. At this time, the resin is further heated whereby the melting thereof is promoted and the resin which is previously melted based on the centrifugal force accompanied with the rotation of the rotating body 14 and the resin which is supplied afterward are compatibilized. That is, as the inner peripheral wall 15 of the rotating body 14 is gradually declined downwardly from its left to its right, the resin is compatibilized as it is sufficiently heated by the complex force consisting of a force toward the radial direction incurred by the centrifugal force and the forwarding force based on the taper-shape downward inclined plane of the inner peripheral wall 15. The melted resin flows along the inner peripheral wall 15 in the circular passage 49 and gradually is transferred along the circular passage 52.

The cone shaped member 44 is provided inside of the rotating body 14 and the aggregate discharge member 37 and promotes the smooth flow of the melted resin which moves within the circular passage 49 along the inner peripheral wall 15 of the rotating body 14 and then which is led out of the discharge passage 41 through the circular passage 52, whereby it is possible to prevent the stay-tendency of the resin material in the portion of axial line in the small diameter peripheral wall 16 and also to prevent accumulation of the melted resin in the place near the discharge portion 39. Said cone shaped member 44 can also increase the discharge pressure in the discharge portion 39 by the normal stress effect.

Referring to FIG. 5, the melted resin led out from the circular passage 52 through the discharge passage 41 is formed to a continuous sheet-like strip and then forwarded to the next process by rolls 55, 55 while being cooled by any suitable cooling means such as air-cooling or water-cooling. In this case, the rotating body is rotated at a speed which imparts the centrifugal force of 5G or more to the resin.

The plasticizing apparatus according to the present invention is the rotary type plasticizing apparatus and comprises a horizontal rotating body having a substantially frusto-conical peripheral surface and an inner peripheral wall with its diameters successively increasing from the small diameter inner peripheral wall to the large-diameter inner peripheral wall and with its rotating axis set horizontal, and a heating means for heating the rotating body, said rotating body being adapted to be fed with resin material onto the inner peripheral wall of said rotating body from said small-diameter inner peripheral wall while heating and rotating said rotating body, said resin material being forwarded by the pressing force on the inner peripheral wall and the propelling force due to the centrifugal force produced by the rotation of the rotating body, said resin material being melted and plasticized by said heating means, and said melted resin is lead out through a large diameter inner peripheral wall.

In the method according to the present invention, as the resin is agitated and compatibilized by the complex force of the pressing force by the centrifugal force on the inner peripheral wall of the rotating body and the forwarding force based on the inclined plane, it is easy to adjust and adapt the plasticization condition to the melting viscosity of the resin by varying the rotary speed of the rotating body, and further the melt index of the resin can be appropriately selected from a wide range.

Further, as compared with the conventional extruder having a screw, in the method of the present invention, the more processing capacity can be obtained with lesser fuel cost and power cost, no deterioration of the resin is accompanied as the shearing of the molecule is not incurred during the compatibilization, the elimination of volatile matter and moisture, etc. can be easily made as the plasticization can be carried out under the centrifugal force. Moreover, while solid resin material of granular form is required to be used in the conventional screw type extruder, the apparatus according to the present invention can be disposed directly to the polymerization device which produces the resin, because there is no restriction to the shape of resin material to be supplied.

Further, as shown in FIG. 4, the sectional shape of the rotating body may be designed to divide the inner peripheral wall 56 into roughly three sections. Namely, by varying the caster of respective sections such as the portion 57 for the feeding section, the portion 58 for the melting section and the portion 59 for the extruding section, the effectiveness of melting, compatibility, and extrusion can be more improved.

Figure 6:
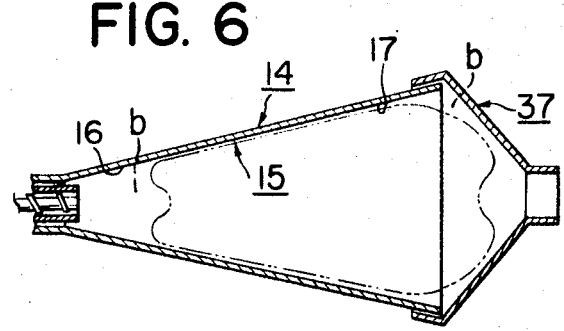
FIG. 6 is a sectional view of the rotary type plasticizing apparatus for explaining a resin flow in the apparatus.

In the case where said cone shape member is not used, as shown in FIG. 6, when the raw material is supplied excessively, or when the resistance is imparted with respect to the discharge of the melted resin, the stagnation of the melted resin is incurred in the neighbourhood of the axial line at the charging side of the raw material resin into the rotary body and in the neighbourhood leading to the discharge passage of the aggregate discharge member. Said cone shape member functions to smooth the transference of the melted resin which flows along with the inner peripheral wall of the rotary body through said cone shape member, whereby the stagnation of the resin at the side of the small diameter part of the rotating body can be prevented. Therefore, the thermal deterioration of the resin accompanied by the stagnation can be prevented and the flow condition of the melted resin along with the inner peripheral surface of the aggregate discharge member can be further smoothed; especially, as the stagnation of the resin around the area covering from the funnel wall portion to the discharge passage can be prevented, the extrusion pressure can be increased.

Figure 7:
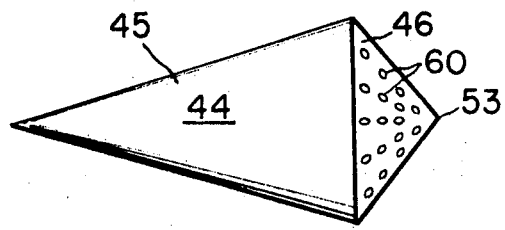
FIG. 7 is a side view of the modified embodiment of a cone shaped member in said rotary type plasticizing apparatus.

In FIG. 7, there is shown a modified example of the cone shape member wherein rectangular grooves 60, 60 . . . are engraved in the inclined direction on the peripheral surface of the conical shaped portion 46 covering from its point end 53 to the base part, and then the kneading effectiveness can be brought, within the circular passage 52, by the concavo-convex formed on the inner peripheral wall surface 50 of the funnel wall portion 38 and the outer peripheral surface of the conical shaped portion 46.

Figure 8:
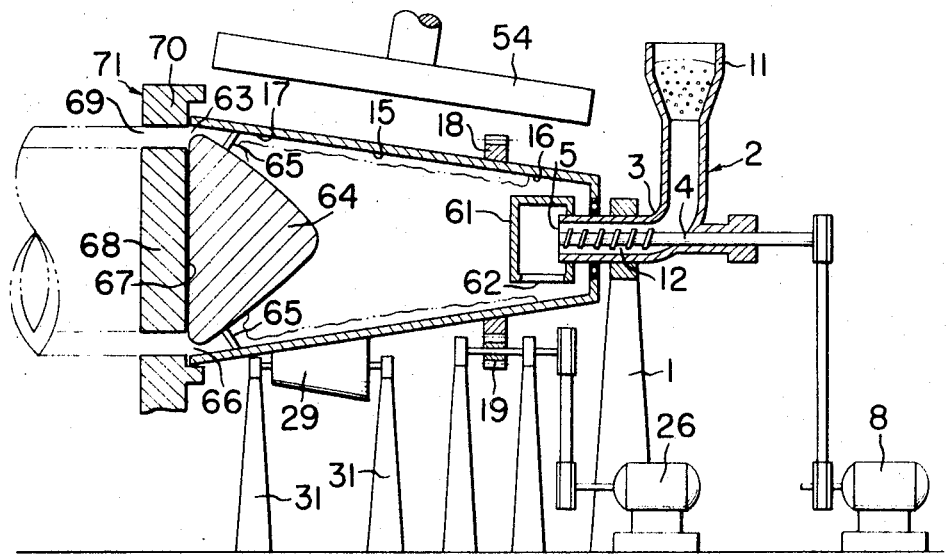
FIG. 8 is a sectional view of the main part of another apparatus to which a plasticizing method of the present invention is applied.

FIG. 8 shows an apparatus for producing a cylindrical synthetic resin formed article to which the method according to this invention is applied.

In FIG. 8, a chute frame 61 is securely fixed to the opening 5 of the flow passage wall 3 and a chute 62 which penetrates through the chute frame 61 is provided thereat.

There is provided a guide body 64 of a conical shape in the inner side than the opening 63 of the rotating body 14. In order to rotate the axial line of said guide body 64 unitedly with the axial line of the rotating body 14, the outer ends of the support pieces 65, 65 in the radial directions are fixed to the peripheral wall of the rotating body 14 and the inner ends thereof are fixed to the corresponding parts of the guide body 64 respectively. In this case, the end fringe of the opening 63 of the rotating body 14 and the outer end surface of the guide body 64 are approximately accorded with each other, and a necessary peripheral gap 66 is formed between the inner fringe of the opening 63 and the outer end peripheral fringe of the guide body 64. Further, the guide body 64 can be transferred in the axial line direction, whereby the peripheral gap 66 is made to be freely adjustable.

Further, a discharge mouth piece 71 consisting of the inside mouth piece 68 having a contact surface 67 which is freely contacted and moved with respect to the outer end surface of the guide body 64 and a ring shape outside mouth piece 70 having the necessary peripheral gap 69 between the peripheral surface of the inside mouth piece 68 and itself is fixedly provided around the opening 63 of the rotating body 14, and in this case the rotating body 14 is slidably provided. In FIG. 8, the same numerals as indicated in FIG. 1 are used.

In this case, the material a which is gradually sent by the screw bar 4 is dropped from the chute 62 of the chute frame 61 into the inner peripheral wall 15 of the rotating body 14. However, the resin which was previously pressed against the inner peripheral wall 15 and melted is caused by the pressing force and forwarding force by the component of force of the centrifugal force based on the inclined plane of the inner peripheral wall 15 to be continuously forced to the right side along the inner peripheral wall 15 of the rotating body 14. At this time, the resin is further heated whereby the melting thereof is promoted and the resin which is previously melted based on the centrifugal force accompanied with the rotation of the rotating body 14 and the resin which is supplied afterward are compatibilized.

When the resin thus melted is reached in the neighbourhood of the opening 63 of the rotating body 14 and brought to the skirt part of the guide member 64, the melted resin is guided out from the peripheral gap 69 between the inside mouth piece 68 and the outside mouth piece 70 of a ring shape through the peripheral gap 66 of the large diameter inner peripheral wall 17 based on the complex extruding force consisting of said centrifugal force as the resin is squeezed. The resin thus guided out is continuously formed into a cylinder shape, whereby the cylinder shape products of the resin can be continuously produced by any suitable cooling means such as air-cooling or water-cooling.

In the embodiment of the present invention, as the peripheral gap is formed to be a ring shape by adopting a fixed inside mouth piece and a fixed outside ring shape mouth piece which are freely slidable and contacted with the outer end surface of the guide member, cylinder shape products can be formed by the extrusion. In the above-mentioned case, as the peripheral gap is formed to be a ring shape by using a fixed inside mouth piece which is freely slided and contacted with the outer end surface of the guide body and the fixed outside ring shape mouth piece, cylinder shape products can be extruded and moulded.

Figure 9:
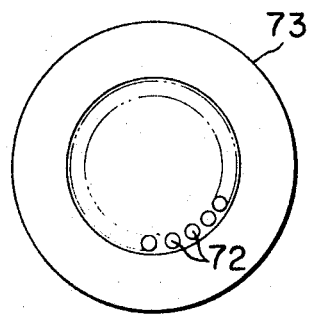
FIGS. 9, 10 and 11 are respectively front views of other modified embodiments of the discharge mouth pieces shown in FIG. 8.
Figure 10:
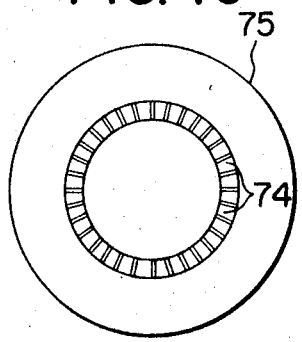
Figure 11:
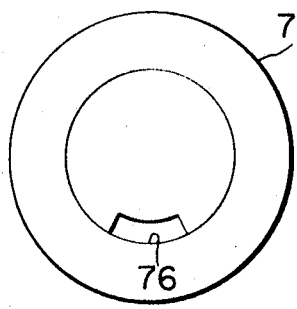

Instead of said discharge mouth piece 70, as shown in FIG. 9, FIG. 10, and FIG. 11, when the discharge mouth piece 73 having a discharge holes 72, 72 . . . of which the section is circle or when the discharge mouth piece 75 having a discharge holed 74, 74 . . . of which section may be any shape such as fine square shape, triangle shape, round shape, etc., and a discharge mouth piece 77 having discharge hole 76 of which is a arc shape, is used, the extrusion molded products of round bar shape, extrusion molded products of thread shape, and belt shape extrusion molded products of arc shape can be continuously produced.

In FIG. 12, there is shown another cone shaped member 78. The cone shaped member 78 has a conical body outer peripheral surface 79 which inclines to the same direction as the inner peripheral wall 15 of the rotating body 14. That is, the cone shaped member 78 is a conical body comprising an end part at the side of small diameter inner peripheral wall 16 of the rotating body 14 to be a point end thereof and the other part 81 at the side of the large diameter inner peripheral wall 17 of the rotating body 4 to be a disc shape thereof. The other part 81 is positioned in the neighbourhood of the slidable part of the large diameter inner peripheral wall 17 of the rotating body 14 and the aggregate discharge member 37, and the rotating body 14 and the cone shaped member 78 are integrally and rotatably connected by the connecting pieces 82, 82. As described above, there is formed a ring shape gap between the inner peripheral wall 15 of the rotating body 14 and the outer peripheral surface 79 of the cone shaped member 78. Further, an angle of inclination of the outer peripheral surface 79 of the cone shaped member 78 is made to be slightly larger than the angle inclination of the inner peripheral wall 15 of the rotating body 14, and the ring shape gap is reduced from the small diameter inner peripheral wall 16 of the rotating body 14 toward the large diameter inner peripheral wall 17, thereby to form the circular passage 83. Furthermore, the axial line of the rotating body 14 and the axial line of the cone shaped member 78 are made to be coaxial.

In this case, melted resin which is melted and plasticized by the inner peripheral wall pressing force and the propelling force based on the centrifugal action accompanied by rotating body 14 is transferred to the large diameter inner peripheral wall 17 along with the inner peripheral wall 15, and then the resin is transferred to the aggregate discharge member 37. In this case, the cone shape member 78 is integrally rotated with the rotating body 14 and then the melted resin which is transferred along with the inner peripheral wall 3 of the rotating body 14 is filled in the circular passage 83 and is flowed smoothly there through, whereby the tendency of stagnation of the resin at the axial line portion of the small diameter peripheral wall 16 of the rotating body 14 is thus prevented.

In FIGS. 13 and 14, there are shown modified examples of the cone shaped member. The outer peripheral surface of the cone shaped member 84 shown in FIG. 13 is formed to be a conical body peripheral surface. The conical shape outer peripheral surface is formed by the outer peripheral surface 86 having a necessary thickness, of which the other end is closed and made to be a cavity 85.

The outer peripheral surface 89 of the cone shaped member 87 as shown in FIG. 14 is formed by the parabolic outer peripheral wall 88. The action and effectiveness of these examples in which these respective cone shaped members 84, 87 are provided in the rotating body 14 are the same as in the case of said cone shaped member 78.

FIGS. 15 through 18 show improved rotating body wherein there is provided the necessary number of projections 92, 92 . . . on the inner peripheral wall 91 of the rotating body 90 in its peripheral direction. These projections 92, 92 . . . are consisted of a projection group 92a and a projection group 92b which are parted with the necessary distance in the axial line direction of the rotating body 90 and parted with the same interval each other in the peripheral direction. Further, these projection groups 92a and 92b are disposed in the zigzag form, and respective projections 92, 92 . . . are projected and inclined in the axial line direction.

Figure 19:
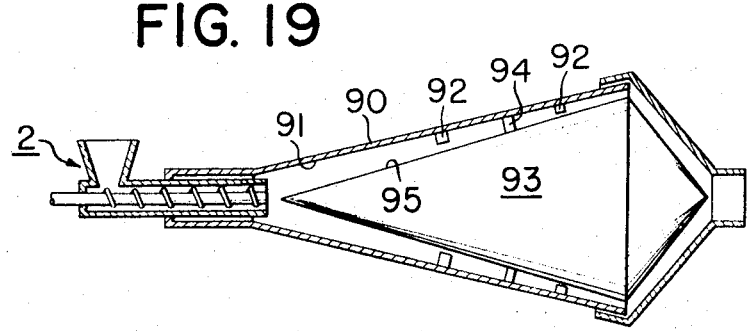
FIG. 19 is a sectional view of the rotary type plasticizing apparatus having the rotating body shown FIG. 15 and a cone shaped member.
Figure 20:
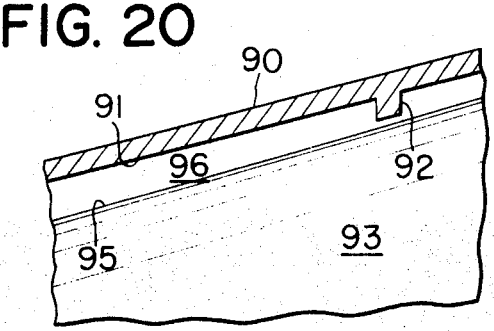
FIG. 20 is a partial sectional view of the rotary type plasticizing apparatus in FIG. 19.

In the present embodiment, two projection groups 92a, 92b in the axial line direction thereof and four projections 92, 92 . . . in the peripheral direction are arranged in zig-zag form on the inner peripheral wall 15 of the rotating body 90, and these are inclined in he axial direction. However, the positions for arranging these projections 92, 92 . . . and the number thereof are determined by taking the size of the rotating body and the flow condition of the melted resin into consideration. Therefore, these are not limited in the cases of the present embodiments. In this case, when the melted resin plasticized on the inner peripheral wall 91 of the rotating body 90 flows along with the inner peripheral wall 91, the projections 92, 92 . . . projectedly provided on the inner peripheral wall 91 of the rotating body 90 impart the kneading effectiveness to the flowing melted resin. Namely, based on the complex force consisting of the propelling force to the melted resin accompanied by the rotation of the rotating body 90 and the rotating force in the peripheral direction by the projections 92, 92 . . . , the kneading effectiveness can be imparted to the melted resin. In FIGS. 19 and 20, there is provided a cone shaped member 93 within the rotating body 90, and the cone shaped member 93 and the rotating body 90 are formed to be integrally rotated by connecting both with the connection pieces 94, 94.

In this case, an extremely narrow gap is left between respective extremities of the projections 92, 92 . . . and the outer peripheral wall 95 of the cone shaped member 93. In such a device, the same kneading effectiveness as in the aforementioned device can be imparted to the melted resin which flows within the circular passage 96 formed by the inner peripheral wall 91 of the rotating body 90 and the outer peripheral wall 95 of the cone shaped member 93.

Said rotating body is extremely effective and suitable as a melted resin kneading device in the rotary type plasticizing apparatus.

Figure 21:
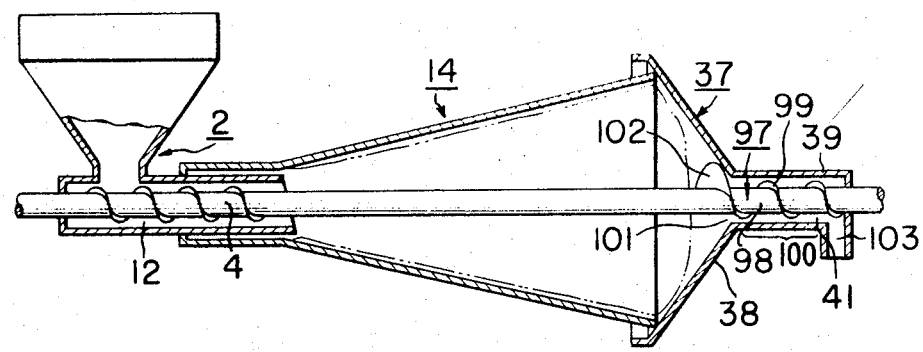
FIG. 21 is a sectional view of the rotary type plasticizing apparatus which is adapted to increase a discharge pressure of the melted resin.

In FIG. 21, there is shown a case whereby discharge pressure can be increased, wherein a delivery screw bar 4 provided within the horizontal passage 12 of the resin material delivery mechanism 2 and a discharge pressure increasing portion 97 formed on the same axis thereof are provided within the aggregate discharge member 37. In this case, with respect to the discharge pressure increasing portion 97, the screw part 99 wound on a bar part 98 is positioned over the funnel wall portion 38 and discharge portion 39. Especially, the diameter of the set part of the screw part 99 is formed to be larger than the other portions of the screw part 99, that is, than the portion 100 positioned within the discharge passage 41, and a screw part 102 having a large diameter which forms an extremely narrow rotating gap between the discharge portion 39, in the funnel wall portion 38 and the inner surface in the neighbourhood of the transition part 101 is provided. Further, although the delivery screw bar 4 and the discharge pressure increasing portion 97 are arranged to be coaxial, these can, of course, be divided into two parts whereat both are freely connected at any desired position and these can be re-composed and freely exchanged in an appropriate manner.

In the method as mentioned above, said resin is melted and plasticized by the inner peripheral wall press force and the propelling force based on a centrifugal action accompanied by the rotation of the rotating body 14, the melted resin thus treated is transferred to the large diameter inner peripheral wall along with the inner peripheral wall, and then the resin is further transferred to the aggregate discharge member 37. In this case, the melted resin is pushed by the succeeding melted resin in the funnel wall portion 38 of the aggregate discharge member 37, and then the resin is stagnated for a short period at the transition part 101 of the discharge passage 41 corresponding to the summit part of the funnel wall portion 38. However, the pressing force action is generated by the large diameter screw part 102 of the discharge pressure increasing portion 97 which is rotated by the suitable driving mechanism (not shown), whereby the melted resin is gradually forced to the discharge passage 41 from the transition part 101. In the discharge passage 41, the melted resin is hence supplied to the discharge port 103 by the portion 100 of the screw part 99.

As described hereinabove, in said rotary type plasticizing apparatus, the discharge pressure increasing portion provided in the aggregate discharge member which is crowned on the large diameter portion of the rotating body is formed to be coaxial or coaxially with the delivery screw bar of the delivery mechanism. Especially, as the large diameter screw part is provided on the discharge pressure increasing portion thereby to press and push the melted resin, the melted resin can be fed under the sufficient pressure in the case where the melted resin is supplied to the molding mouth piece or the like connected to the discharge port. Therefore, the performance of the rotary type plasticizing apparatus of this type can be more improved and moreover as the delivery screw bar and the discharge pressure increasing portion are formed to be coaxial or coaxially, the shaft support thereof can be as strengthened.

Figure 22:
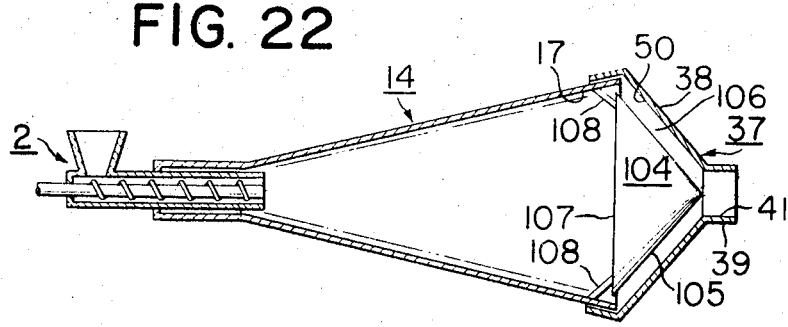
FIG. 22 is a sectional view of the rotary type plasticizing apparatus having another cone shaped member.
Figure 23A:
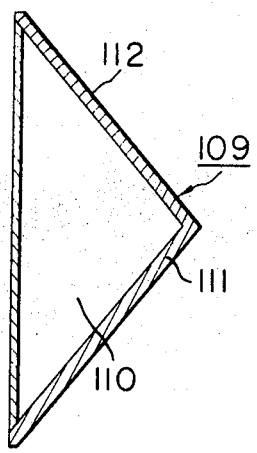
FIG. 23 (A) is a longitudinal sectional view of the modified embodiment of the cone shaped member shown in FIG. 22, and FIG. 23 (B) is a side view of the other embodiment of the same.
Figure 23B:
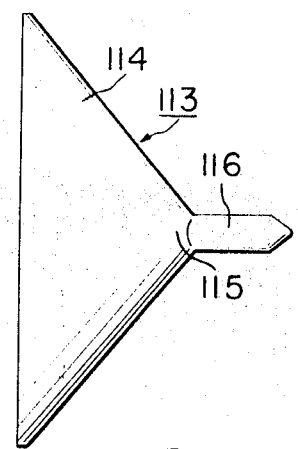

In FIGS. 22 and 23, there is shown another rotary type plasticizing apparatus which functions to increased the discharge pressure. In the funnel wall portion 38 of the aggregate discharge member 37, there is provided a cone shaped member 104. Said cone shaped member 104 comprises a conical peripheral surface 105, a summit positioned in the side of said discharge passage 41 and a base end 107 which is formed to be faced in the neighbourhood of the sliding contact part with the large diameter peripheral wall 17 of the rotating body 14 and the funnel wall portion 38 by means of connecting pieces 108, 108, whereby said member is formed to be integrally rotated with the rotating body 14. Thus, the melted resin flow passage 106 is formed by the inner peripheral surface 50 of the funnel wall portion 38 of the aggregate discharge member 37 and the conical peripheral surface 105 of the cone shaped member 104.

By the above-mentioned manner, when the melted resin transferred to the melted resin aggregate discharge member 37 is further transferred along with the flow passage 106 formed by the funnel wall portion 38 and the cone shaped member 104, as said melted resin is a visco-elastic fluid, the pressing force is acted in the direction of the rotary center, that is, in the direction of the axial line of the cone shaped member 104 between the peripheral surface 105 of the rotating cone shaped member 104 and the inner surface of the funnel wall portion 38 of the fixed aggregate discharge member 37 within the melted resin flow passage 106; in other words, a normal stress effect is caused thereat, whereby the melted resin is pressed in the neighbourhood of the summit of the cone shaped member 104 and the inlet of the discharge passage 41 of the funnel wall portion 39. Thus, the pressure of the melted resin is increased around the neighbourhood of the summit of the cone shaped member 104, whereby the discharge pressure for the melted resin which is fed to the pertinent positions through the discharge passage 41 and the discharge opening is sufficiently increased.

In the FIGS. 23 (A) and (B), there are shown modified examples of said cone shaped member 104. A core shape member 109 consists of a conical peripheral surface 112 and a peripheral wall portion 111, the inner part of the member being formed to be a cavity part 110. A cone shaped member 113 is constituted by a projecting portion 116 in the axial line direction at the summit 115 of the conical body 114. The action and effectiveness in the case where the aforementioned cone shaped members 109 and 113 are substitued for said cone shaped member 104 are the same as in the case of the cone shaped member 104. Therefore, the various design changes of the cone shaped member are possible.

In general, in the rotary type plasticizing apparatus, the melted resin tends to be stagnated in the neighbourhood of the axial line at the side of the resin material feeding and the axial line to the discharge passage of the aggregate discharge member.

When an apparatus is composed as shown in FIG. 22, a pressing force in the center axial line direction is imparted to the melted resin by the outer peripheral surface of a rotating cone shaped member and the inner surface of the funnel wall portion of the fixed aggregate discharge member, whereby the pressure is imparted to the melted resin in the neighbourhood of the inlet of the discharge passage of the aggregate discharge member and the discharge pressure of the melted resin to be fed to the pertinent positions form the discharge port can be increased.

Figure 24:
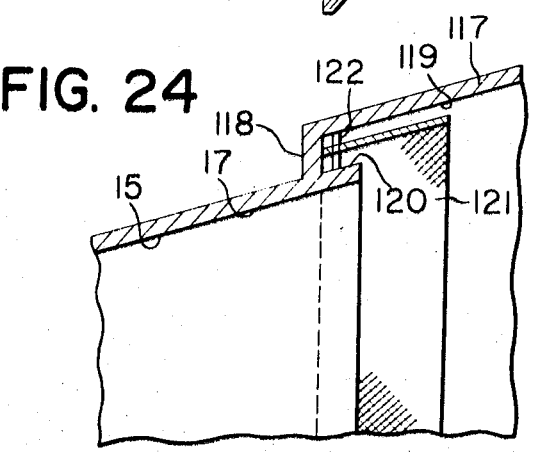
FIG. 24 is a partial sectional view of a rotating body with a foreign substance removing device.

In the example as shown in FIG. 24, an outer race part 117 is provided on the periphery of the large diameter inner peripheral wall 17 of the rotating body. Further, a setting base portion 118 of the outer race part 117 is fixed on the peripheral surface in the slightly left side from said large diameter inner peripheral wall 17, then the inner surface 119 thereof is inclined upwardly at the right side with the same angle of inclination of the inner peripheral wall 15 of the rotating body, and then a required gap is formed between the inner surface 119 and the outer peripheral surface 120 at the end of the large diameter inner peripheral wall 17.

Furthermore, there is provided a foreign substance removing member 121 on the outer periphery at the end of said large diameter inner peripheral wall 17. In this case, a cylindrical net form body having a rigidity is adopted as the foreign substance removing member 121, and the blind motion thereof can be prevented by the connectors 122, 122. Further, there is provided a stage on the portion covering from the end of the large diameter inner peripheral wall 17 to the inner surface of the foreign substance removing member 121, and there is formed an uniform gap between the outer peripheral surface 120 of the large diameter inner peripheral wall 17 and the inner peripheral surface of the foreign substance removing member 121. Furthermore, a melted resin aggregate discharge member is crowned over the opening end of said outer race part 117, and then the aggregate discharge member is fixed to a pertinent position.

When a apparatus is constituted as mentioned above, the melted resin is transferred to the large diameter inner peripheral wall 17 along with the inner peripheral wall 15, further transferred to the inner surface of the outer race part 117 through the foreign substance removing member 121 provided at the transition part covering a part from the large diameter inner peripheral wall 17 to the outer race part 117, then flowed along with the inner surface of the outer race part 117 as in the case of the inner peripheral wall 15, and then transferred to the inner surface of the funnel wall portion of the aggregate discharge member. Therefore, when the melted resin which has ben transferred along with the inner peripheral wall 15 passes through the foreign substance removing member 121, the member functions to prevent the passage of the foreign substances such as metal pieces and lump shape substances contained in the melted resin, whereby such substances are removed from the melted resin which is transferred to the inner surface of the outer race part 117. Accordingly, the melted resin not containing such foreign substances can be fed to any pertinent positions such as molding machine through the aggregate discharge member from the inner surface of the outer race part 117.

As mentioned above, in said rotary type plasticizing apparatus, as there are provided an outer race part at the periphery of the large diameter inner peripheral wall of the rotating body, a foreign substance removing member in the transition part from the large diameter peripheral wall to the outer race part, and a stage at the transition part from said large diameter inner peripheral wall to the foreign substance removing member as well as a peripheral gap, the melted resin containing foreign substances at the transition part can be spread over said foreign substance removing member based on the centrifugal force, whereby the effective area of the foreign substance removing member can be enlarged, and moreover as the pressing force of the melted resin is large, the foreign substances can be efficiently removed.

Figure 25:
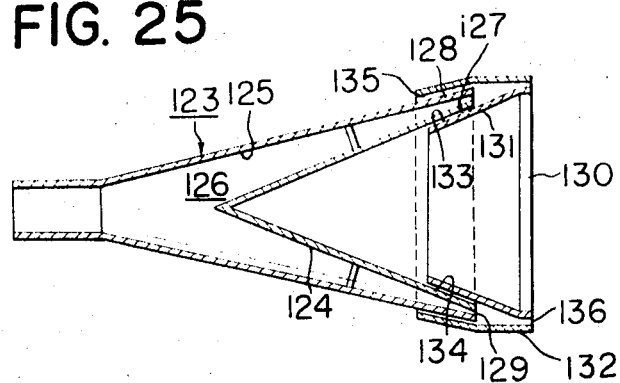
FIG. 25 is a sectional view of the main part of the rotary type plasticizing apparatus adapted to prevent the leakage of a melted resin.
Figure 26:
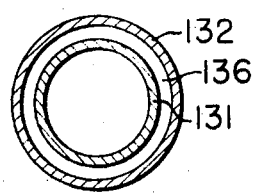
FIG. 26 is a longitudinal sectional view of a melted resin discharge portion of the apparatus shown in FIG. 25.

In FIGS. 25, 26, there is shown a device for preventing the leakage of the melted resin.

In FIG. 25, there is shown a rotary type plasticizing apparatus wherein there is provided a cone shaped member 124 in the rotating body 123, the flow of the melted resin which is transferred along with the inner peripheral wall surface 125 of the rotating body 123 is smoothed by the circular passage 126 formed by the peripheral surface of the cone shaped member 124 and the inner peripheral wall surface 125 of the rotating body 123, and the mouth piece 130 for the tube body forming is faced to the circular lead-out port 129 formed by the outer periphery of the base end 127 of the cone shaped member 124 and the end of the large diameter inner peripheral wall 128 of the rotating body 123. Further, the mouth piece 130 is formed by the mandrel part 131 and the shell part 132, a rotatable sealing mechanism is formed by the outer peripheral surface 133 of the mandrel part 131 and the inner peripheral surface 134 of the base end 127 of the cone shaped member 124, a rotatable sealing mechanism is formed by the inner peripheral surface of the inclined part 135 of the shell part 132 and the outer peripheral surface of the large diameter inner peripheral wall 128 of the rotating body 123, and then the melted resin which passes through said ring shape leading-out port 129 is formed into a tube body through the discharge port 136 of the mouth piece 130.

As described above, in the cases where a rotatable sealing mechanism is formed between the outer peripheral surface of the large diameter inner peripheral wall 128 of the rotating body 123 and the inner peripheral surface of the shell part 132 of the mouth piece 130 and another rotatable sealing mechanism is formed between the outer peripheral surface of the mandrel part 131 of the mouth piece 130 and the inner peripheral surfac 134 of the cone shaped member 124 provided within the rotating body 123, no leakage of the melted resin from these rotatable sealing mechanisms is incurred by the centrigual force accompanied by the integrally rotary motion of the rotating body 123 and the cone shaped member 124.

Figure 27:
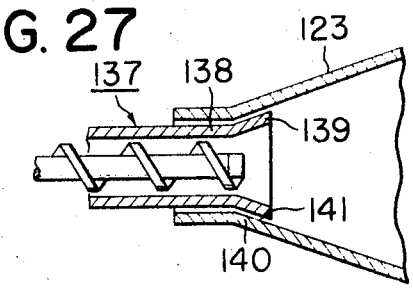
FIG. 27 is a sectional view of the small diameter inner peripheral wall adapted to prevent a leakage of the melted resin.

Further, as shown in FIG. 27, even in the case where the end of the outer cylindrical part 138 of the delivery mechanism 137 is provided as an open-expanding end 139 and a ring shape parallel gap is formed between the open-expanding end 139 and the inner peripheral surface 141 of the small diameter inner peripheral wall 140 of the rotating body 123, no leakage from the gap is incurred.

As described above, in said rotary type plasticizing apparatus, as the rotatable sealing mechanism is provided on the connection part between the members connected to the rotating body, said rotatable sealing mechanism is inclined outside direction, and as the leakage of the melted resin is prevented by utilizing the centrifugal force action based on the rotation of the rotating body, the frictional loss and power loss can be remarkably reduced.

Figure 28:
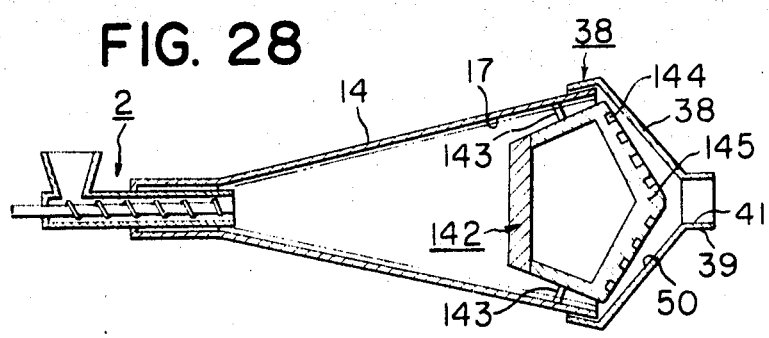
FIG. 28 is a sectional view of the other type of the rotary type plasticizing apparatus adapted to increase a discharge pressure.
Figure 29:
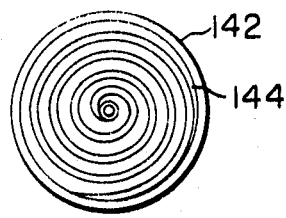
FIG. 29 is a front view of a pressure increasing member shown in FIG. 28.

In an example shown in FIG. 28, there is provided an discharge pressure increasing member 142 having its front part in the funnel wall portion 38 of the aggregate discharge member 37 and having its base part faced with the inside of the large diameter in peripheral wall 17 of the rotating body 14. The discharge pressure increasing member 142 is connected with the rotating body 14 by means of the connecting pieces 143, 143 and is rotated freely and integrally therewith. Further, said discharge pressure increasing member 142 has, as shown in FIG. 29, whirlpool shape grooves 144 at its front part and an appearance of a conical shape, and the necessary interval is maintained between the outer peripheral surface of said discharge pressure increasing member 142 and the inner wall surface 50 of the funnel wall portion 38.

By the above-mentioned manner, the melted resin which flows along with the inner wall surface 50 of the aggregate discharge member 37 is subjected to a strong component of force of press force in the forward direction based on the centrifugal force action by the forward end 145 of the discharge pressure increasing member 142 which is rotated integrally with the rotating body 14 and then the melted resin is pushed around the portion provided between the center part of the discharge pressure increasing member 142 and the inlet of the discharge passage 41, whereby discharge pressure of the melted resin which is fed to any pertinent position through the discharge passage 41 and discharge opening is sufficiently increased.

As described above, in said rotary type plasticizing apparatus, as the melted resin which is flowed along with the inner peripheral surface of the funnel wall portion of the aggregate discharge member by the front forward end part of the discharge pressure increasing member which is unitedly rotated with the rotating body, is pushed and transferred in the central axial line direction by pressing it in the forward direction by the centrifugal force action, the pressure of the melted resin in the neighbourhood of the inlet of the discharge passage of the aggregate discharge member can be increased, and the discharge pressure of the melted resin to be fed to any pertinent position from the discharge port can be increased thereby.

The case wherein said rotary type plasticizing apparatus is used for producing synthetic resin, thick, formed articles such as billets or the like will be explained referring to FIG. 30.

The numeral 146 designates a melted resin feeding mechanism, and the numeral 147 is a forming mechanism for producing formed articles, which forms formed articles by introducing melted resin from the feeding mechanism 146. The feeding mechanism 146 for melted resin is provided with a rotating body 152 rotatably supported by supporting frames 150, 151 provided at a supporting base portion 149 formed at the upper part of the machine base 148. At the parallel portion 153 on the right end of the rotating body 152, there is inserted a flow passage 154, and the tip end of the delivery screw rod 155 inserted at the flow passage 154 is arranged at the delivery opening 156 of said flow passage 154. A sprocket wheel 158 fixed on the shaft of a driving motor 157 mounted on the machine base 148 and a sprocket wheel 159 fixed on the exposed end of said screw rod 155 are looped over by a chain 160. Thus a resin material dropped from a hopper 161 is adopted to be successively supplied to the small diameter inner peripheral wall 162 of rotating body 152 by means of the screw rod 155. Said rotating body 152 is supported at the parallel portion 153 on right end by the supporting portion 163 of said supporting frame 151. At the same time, a sprocket wheel 164 provided on the outer periphery of the parallel portion 153 and a sprocket wheel 166 fixed on a shaft of a driving motor 165 mounted on the supporting base portion 149 of the machine base 148 are looped over by a chain 167. The axial line of the rotating body 152 is maintained horizontal by rotatably supporting the external periphery of large diameter inner peripheral wall 168 at the left end thereof by means of supporting portion 169 of the supporting frame 150. The inner periphery wall surface of the rotating body 152 is gradually increased beginning from said small diameter inner perhpheral wall 162 to the large diameter inner peripheral wall 168 forming a uniform taper with respect to the axial line, and presenting a downward sloped surface. Near the outer peripheral surface of the rotating body 152, there are arranged a heating device 169 such as an electric heater. Said screw rod 155 is used only for feeding resin material from the hopper 161 into the rotating body 152.

Next, the forming mechanism 147 for billet comprises, as shown in FIG. 30, a cylindrical rotating metal mold 172 provided with an introducing opening 171 at the right end formed corresponding to the opening portion 170 at the left end of said rotating body 152. This rotating metal mold 172 may have a construction such as split type, integrated type, etc., but in this example, a detachable cover body 174 is provided on the left end opening 173. When a rotating metal mold 172 is to be formed, this cover body 174 is fit tightly thereon, and a molding surface is formed by cooperation of the peripheral portion of the inner surface 175 and the inner peripheral surface 176 of the rotating metal mold 172. The peripheral edge 177 of said introducing opening 171 projects radially and inwardly beyond the inner surface 178 of the peripheral edge 177, and the inner surface 178 of the peripheral edge 177 also forms the molding surface at the forming operation of the rotating metal mold 172. The rotating metal mold 172 is supported rotatably at high speed on a transferrable truck 180 with the rails 179 as the guide. Thus, supports 183, 184 are provided on the car body 182 which is made transferrable on the rails 179 by wheels 181, 181. Rotating shafts 187, 188 are provided journalled at both ends by upper end bearing portions 185, 186 of said supports 183, 184. A sprocket wheel 190 fixed on a driving motor 189 mounted on the car body 182 and another sprocket wheel 194 fixed on a rotating shaft 193 journalled rotatably by separate supports 191, 192 are looped over by a chain 195. Sprocket wheels 196, 197 fixed on a rotating shaft 193 and sprocket wheels 198, 199 fixed on said rotating shafts 187, 188 corresponding to said sprocket wheels 196, 197 are looped over by chains 200, 201. Further, pillow members 202, 202, 203, 203 are screwed on said rotating shafts 187, 188, and the lower surface at the right end of the rotating metal mold 172 is supported by said pillow members 202, 202, and the lower surface at the left end by said pillow members 203, 203, respectively. The pillow members 202, 203 are made to have a sufficient peripheral frictional force so that the rotating metal mold 172, which are supported by the pillow members 202, 203, may rotate at a high speed with their own rotation. In the drawing, the numeral 204 is a cooling device provided for cooling the external periphery of the rotating metal mold 172.

By using the device consisting of said melted resin feeding mechanism 146 and the forming mechansim 147 for billet material, and by transferring the forming mechanism 147, the left end opening 170 of the rotating body 152 is inserted into the right end opening 171 of the rotating metal mold 172, and thus a rotating sealed state is obtained. After which driving motor 157, 165, 189 are operated, and upon charging resin material from the hopper 161, the resin material is delivered through the flow passage wall 154 to the left by means of the screw rod 155, and the resin material drops on the small diameter inner peripheral wall 162 of the rotating body 152 rotated by the driving motor 165. Since the rotating body 152 is heated by the heating device 169, the resin material is kneaded and mixed by the centrifugal force produced by the rotation of the rotating body 152 while being melted therein, and is delivered successively due to the tapered inner surface to the left end opening 170. In this way the melted resin is supplied into the rotating metal mold 172 through the left end opening 170. Since the rotating metal mold 172 is rotating at high speed, the delivered melted resin is pushed against the inner peripheral surface of the rotating metal mold 172 by the centrifugal force, and the resin is pressurized in the rotating metal mold 172. In this manner, the melted resin increases its thickness gradually while being pressed, and after the predetermined quantity of melted resin is introduced in the rotating metal mold 172, the supply of the resin material is stopped. Then the forming mechanism 147 is detached from the feeding mechanism 146, transferred just below the cooling bevice 204, and cooled by pouring water from above while keeping the rotation. Thus, the rotating metal mold 172 is cooled of its external surface while rotating constantly, so that the melted resin is cooled inside the rotating metal mold 172 while being pressed. In other words, the melted resin is subjected to a pressure even when it is cooled.

The rotation of the rotating body 152 in said feeding mechanism 146 is preferably so adjusted that the centrifugal force acting on the supplied resin is more than 5G, that is, when the mean diameter of the rotating body 152 is 15 cm, 250 — 1,500 R. P. M., and espcially 400 — 800 R. P. M. will be appropriate.

Further, the number of revolution of the rotating metal mold 172 of the forming mechanism 147 is preferably be so adjusted that the centrifugal force acting on the resin is more than 2G at the receiving of melted resin, and at the cooling, more than 2G, preferably 5G or more. When a rotating metal mold having a diameter of 40 cm is used, it will be preferable to rotate it at a speed of 100 – 500 R. P. M. at the receiving of melted resin; 100 – 1,000 R.P.M. at the cooling, or, more preferably, 300 – 800 R.P.M.

The formed article 205 thus cooled and set in the rotating metal mold 172 is taken out of the mold by removing the cover body 174. Then a cylindrical formed article 205 having an annular cross section as shown in FIG. 31 is obtained. By cutting the formed article 205 radially and rectilinearly at required number of points on the end surface, and also by cutting in axial direction so as to form a several number of segmental pieces 206. Further, by cutting on both sides and upper and lower arcuate portions straightly so as to form a small rectangular piece 207. Thus, according to the present invention, a method of producing thick formed articles, such as synthetic resin billets is provided, in which melted resin is introduced into a rotating metal mold, and the resin material is compressed and cooled while being pressurized by means of centrifugal force due to the rotation of said rotating metal mold and by an external cooling device. Especially, it is possible to produce thick formed articles having no mold cavities nor sink marks by cooling, while pressurizing the resin material in the rotating metal mold using centrifugal force. While the maximum thickness of the billets having no mold cavities nor sink marks produced according to the conventional methods is about 5 mm, with the present invention, it is possible to obtain products having a thickness of several times thereof, so that the merit of the method of producing synthetic resin formed articles having a larger thickness is so remarkable.

Said rotary type plasticizing apparatus can be applied to the synthetic resin granulating device.

In FIG. 34, there is provided a resin material feeding mechanism 208, wherein the resin material a charged from a hopper 209 is continuously transferred along with the supply route 213 in a cylinder 212 by a delivery screw bar 211 for feeding which is rotated by means of a driving mechanism 210. At the discharge end of said cylinder 212, said rotating body 215 having an inner peripheral wall 214 connected to the supply route 213 is provided.

The rotating body 215 as viewed in FIG. 34 has its larger diameter in the left end than that in the left end. The diameter of the inner peripheral wall is gradually expanded, from the left end to the right end, from the small diameter inner peripheral wall 216 toward the large diameter inner peripheral wall 217.

Figure 35:
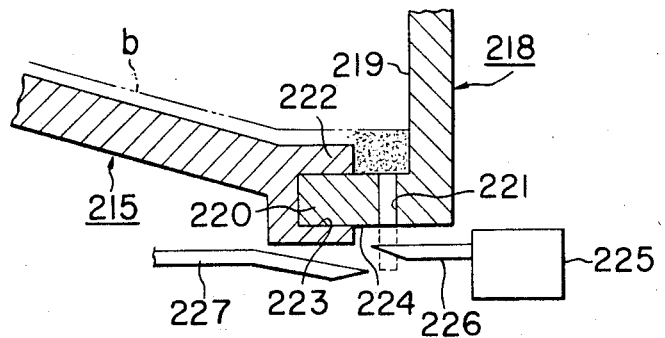
FIG. 35 is a partial longitudinal sectional view of the apparatus shown in FIG. 34.
Figure 36:
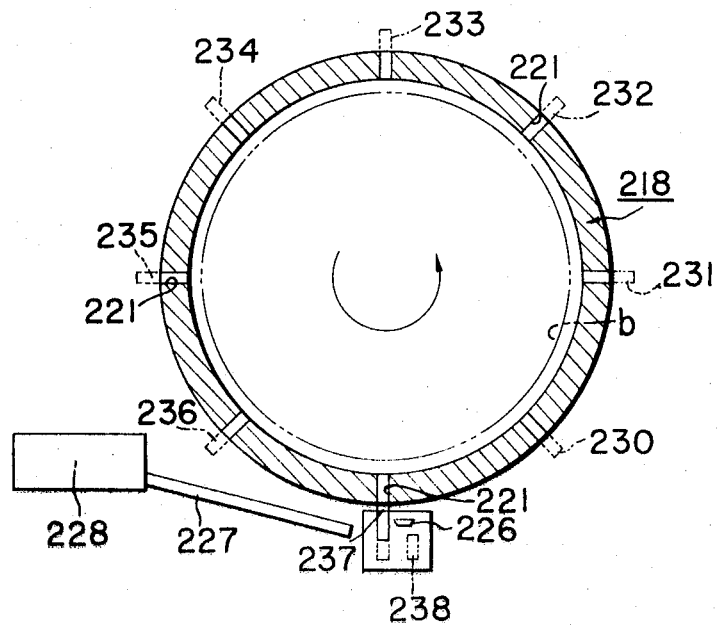
FIG. 36 is a sectional view of a keading-out member showing the operation for cutting-off the melted and then cured resin as pellets.

Further, a leading-out member 218 is adhered at the side of a large diameter inner peripheral wall 217 of the rotating body 215. Furthermore, as shown in FIG. 35 and FIG. 36, with respect to the leading-out member 218, there is stood a ring wall part 220 around the peripheral fringe of a disc shape base part 219, and the necessary numbers of leading-out ports 221, 221 . . . are penetratively provided on the ring wall part 220 at the same interval in the radial direction from the center of said base part 219. In this example, as shown in FIG. 36, the eight leading-out ports 221, 221 . . . are provided at intervals of 45 degrees. The leading-out member 218 is, as shown in FIG. 35, adhered and fixed to the rotating body 215. That is, a ring shaped concave groove 223 is cut-provided on the large diameter part end surface 222 of the rotating body 215, and the end of the ring wall part 220 of the leading-out member 218 is closely and securely fixed in said ring shaped concave groove 223 whereby the leading-out member 218 is formed so as to be integrally rotated with the rotating body 215.

Furthermore, a cutting blade 226 of a cutting mechanism 225, which is faced with the leading-out port 221 in the lower direction of the leading-out member 218, and which is slightly spaced from the outer peripheral surface 224 of the ring wall part 220, is provided. In this case, the cutting blade 226 should be fixed not to disturb the rotation of the rotating body 218 and the leading-out member 218, and further, at least the forward end part of the cutting blade 226 is shifted to collide and contact with the plasticized resin led out from the leading-out port 221.

Furthermore, there is arranged a compressed air blowing tube 227 which is faced with the leading-out port 221 of said leading-out member 218 and the cutting blade 226, and it is so formed that the compressed air form the pressed air source 228 is jetted from the blowing tube 227.

In the drawing, there is shown a cone 229, of which the large diameter part is fixed to the leading-out member 218, and it is rotated integrally with the rotating body 215 and the leading-out member 218. Further, the flow of the resin is smoothed with the peripheral surface thereof.

The resin material a thus charged into the cylinder 212 from the hopper 209 is continuously transferred in the supply route 213 by means of the delivery screw bar 211, and then the material is further supplied to the inner surface of the small diameter inner peripheral wall 216 of the rotating body 215. Then, the rotating body 215 is heated under the rotation thereof, and the resin material a is pressed on the inner peripheral wall 214 of the rotating body 215 by the taper form inclination of the inner peripheral wall 214 and the propelling force generated by the centrifugal force based on the rotation of the rotating body 215. The resin material thus pressed, heated and melted thereat is further transferred gradually to the large diameter inner peripheral wall 217 from the small diameter part inner peripheral wall 216 along with the inner peripheral wall 214. By the above manner, the melted resin b which was melted and transferred along with the inner peripheral wall 214 of the rotating body 215 is then transferred to the inner peripheral surface of the ring wall part 220 of the leading-out member 218 from the large diameter inner peripheral wall 217, then the melted resin b presses the inner peripheral surface of the ring wall part 220 in its outer direction in the radial direction based on the centrifugal force accompanied by the leading-out member 218 being rotated integrally with the rotating body 215, and then the resin is led out to the outside of the leading-out member 218 by the leading-out ports 221, 221 . . . to be exposed. The melted resin b exposed from the leading -out ports 221, 221 is in the exposure conditions such as 230, 231, 232, 233, 234, 235, 236, and 237 as shown in FIG. 36, and the melted resin b exposed by the leading-out port 221 which is brought in the center vertical lower direction of the leading-out member 218, is cut off as the resin is collided and contacted with the cutting blade 226. In this case, in order to prevent the scattering of the cut-off pellet form granules, the compressed air is jetted from the compressed air blowing tube 227, then the pellets 238, 238 . . . are forced to be fallen, and then these are accommodated at the desired position such as a cooling bath (not shown).

As described above, as the screw of the extruding machine used in the conventional means is not adopted herein, no molecular cutting of the melted resin is incurred. Therefore, the present apparatus can be utilized also for the granulation of the resins containing the inorganic fillers and sands, or the like. Further, as any form of material other than powder form and pellet form can be directly supplied, no pre-treatment such as crush, etc. are required.

Further, in the present means, the deaeration can be easily carried out, and bulk plasticizing performance can be obtained. Furthermore, this apparatus may be connected directly with the synthetic resin polymerization producing device and it also can be adopted as a novel plasticizing granulation means of material resin. Still further, this apparatus can be adopted for the reclamation of the granular from the wastes of synthetic resin products having irregular shapes and containing moisture.

Figure 37:
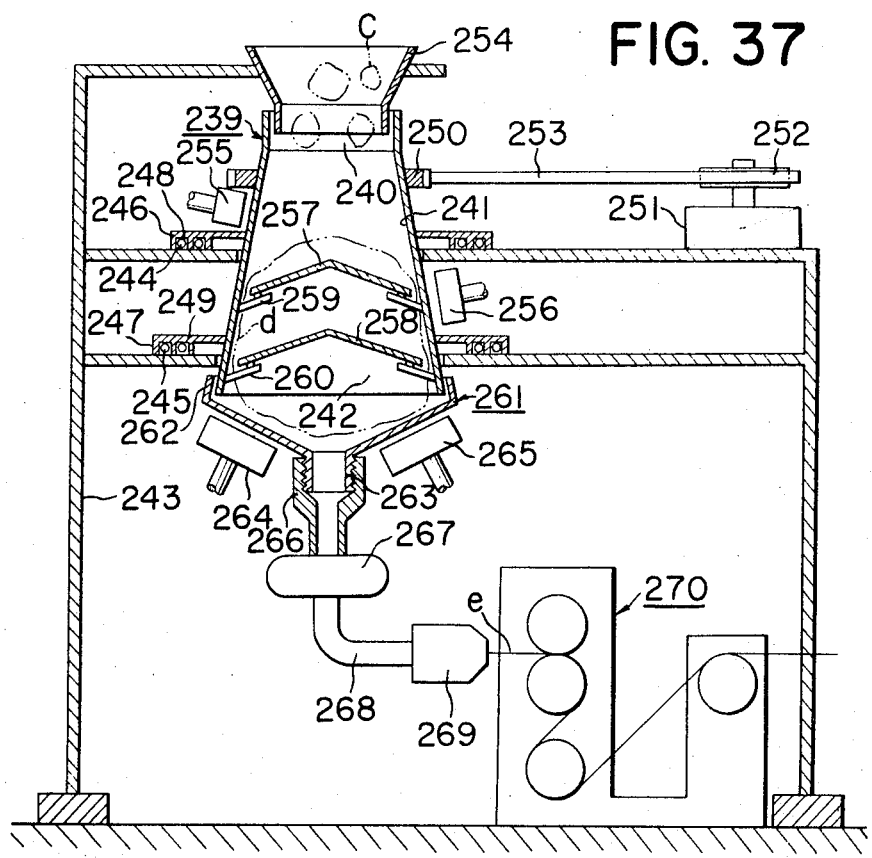
FIG. 37 is a longitudinal sectional view of the main part of a vertical rotary type apparatus to which the plasticizing method of the present invention is applied.

FIG. 37 shows a vertical rotary type plasticizing apparatus. In the drawing, there is shown a rotating body 239 having an opening 240 in its upper part, an inner peripheral wall 241 of which the diameter is gradually expanded toward the lower direction, and a lower part opening 242 of which the diameter is larger than that of said upper part opening 240. Support parts 248, 249 provided on the upper part outer periphery and the lower part outer periphery of the rotating body 239 are rotatably supported by means of bearings 244, 245 and bearing 246, 247 mounted on a machine frame 243. Further, rotating body 239 is rotated by a chain 253 provided between a sprocket wheel 250 securely mounted on the upper part of the rotating body 239 and a sprocket wheel 252 securely fixed to the shaft of a driving electric motor 251 mounted on the machine frame 243. There is also provided a charging hole 254 securely provided on the machine frame 243; a lower hole of the charging hole 254 being slightly inserted into the upper part opening 240 of said rotating body 239. Further, heating devices 255, 256 are disposed at suitable position to heat the rotating body 239. Furthermore, there are provided guide members 257, 258 of a shade form of which each one end of respective members is fixed to the peripheral wall of the rotating body 239, these guide members being projected towards the radial direction thereof. Further, the peripheries of said guide members are fixed and supported by the other ends of support pieces 259, 260 arranged in the peripheral direction with the same interval, and the guide members 257, 258 are integrally rotated with the rotation of the rotating body 239. Also, there is provided a funnel shape leading-out member 261 of which the opened upper part is arranged around the lower part opening 242 of the rotating body 239, the lower part peripheral wall of the rotating body 239 is encircled with the standing upper fringe 262 of the upper end of the leading-out member 261, and then the axial line of a discharge straight cylinder part 263 is accorded with the axial line of the rotating body 239. There are also provided heating devices 264, 265 which heat the leading-out member 261, and a connecting member 266 connected to the discharge straight cylinder part 263 of the leading-out member 261. Furthermore, this embodiment is for the case where the plasticized resin in recovered into a sheet, wherein there are provided a gear pump 267 for taking out a constant quantity of resin as well as for generation of discharging pressure, a guide tube 268, a die 269 for extrusion, and a draw-cooling device 270. By the use of the device as mentioned above, resin material $a$ as synthetic resin wastes having different shapes such as film and lump form, is thrown into the rotating body 239 through the charging hole 254, then the material is once stored at the center part of the guide member 257, and then the material thus stored is further transferred gradually towards the direction of the inner peripheral wall 241 of the rotating body 239 based on the centrifugal force accompanied with the rotation of the guide member 257. During the process, the material $c$ is heated in the heating atmosphere in the rotating body 239 and the material thus heated is further heated and melted in the manner of being pressed on the inner peripheral wall of the rotating body 239 which is sufficiently heated. The material thus treated is then transferred in the lower direction through a narrow interval between the inner peripheral wall 241 of the rotating body 239 and the peripheral fringe of the guide member 257.

The melting of the material is also promoted between the guide member 258 and the rotating body 239 at the second step as in the case of the first step, and the material then drops on the plate form part of the leading-out member 261 from the lower part opening 242 of the rotating body 239. As the leading-out member 261 is also heated by the heating device, the melted resin $d$ gradually drops without any obstruction of the fluidity. After the melted resin is once stored, the melted resin is discharged from the discharge straight cylinder part 263 through the gear pump 267, and then it is sent to the die 269 whereat it is extruded and molded.

As the device shown in the drawing is for the case of the film forming, the film $e$ extruded from the die 269 is wound by means of the draw-cooling device 270.

Among the materials thus continuously charged, the small size materials are melted in advance, and the large size ones are melted afterward. However, when these materials drop into the leading-out member 261 through the lower part opening 242 of the rotating body 239, all of them becomes a melted resin $d$.

In this case, it is preferable to rotate the rotating body 239 at a speed at which 5G or more of the centrifugal force by imparted to the material $c$ to be unitedly rotated in contact with the inner peripheral wall 241 of the rotating body 239.

Figure 38:
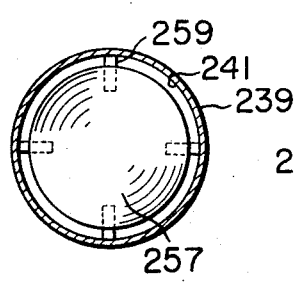
FIG. 38 is a traverse sectional view showing how to fix a guide member to the rotating body shown in FIG. 37.
Figure 39:
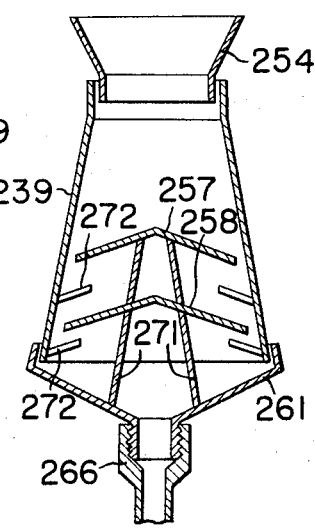
FIG. 39 is a longitudinal sectional view of a modified embodiment of the main part of the apparatus shown in FIG. 37.
Figure 40:
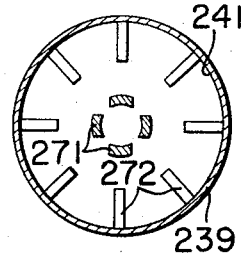
FIG. 40 is a sectional view of the rotating body mounted showing the position of hook members shown in FIG. 39.

FIG. 39 and FIG. 40 show the modified examples of the above-described device. As shown in FIG. 37 and FIG. 38, the guide members 257, 258 of a shade form are formed to be respectively supported by the rotating body 239 thereby to be integrally rotated. However, in FIG. 39 and FIG. 40, there are provided support bars 271, 271 . . . in a standing form on the leading-out member 261, and the guide members 257, 258, are fixed to these support bars 271, 271, . . . . Further, there are provided projecting hoods 272, 272, . . . which are arranged with the same interval in the peripheral direction on the inner peripheral wall 241 of the rotating body 239, which are inclined upwardly, and of which the upper ends are formed to be free ends respectively. Furthermore, unmelted substances to be transferred downwardly through the narrow interval between the inner peripheral wall 241 of the rotating body 239 and the peripheral fringe of the guide members 257, 258 are hooked by these projecting hooks 272, 272 . . . and these substances are heated and melted thereat.

In the present example, the case of film forming was described in the process after the leading-out member. However, when the melted resin discharged from the leading-out member is supplied to the usual molding machine, molded products such as cylinder shape goods, special form products or wire shape products can be obtained. By a casting method, of course, lump shape products and cast products such as synthetic resin blocks can be also produced.

The present method is especially suitable for the bulk treatment of wastes of synthetic resin products. Further, as the wastes after treatment can be reclaimed as formed articles, in the recent treatment of wastes of synthetic resin products the effectiveness thereof is extremely dramatic.

Figure 41:
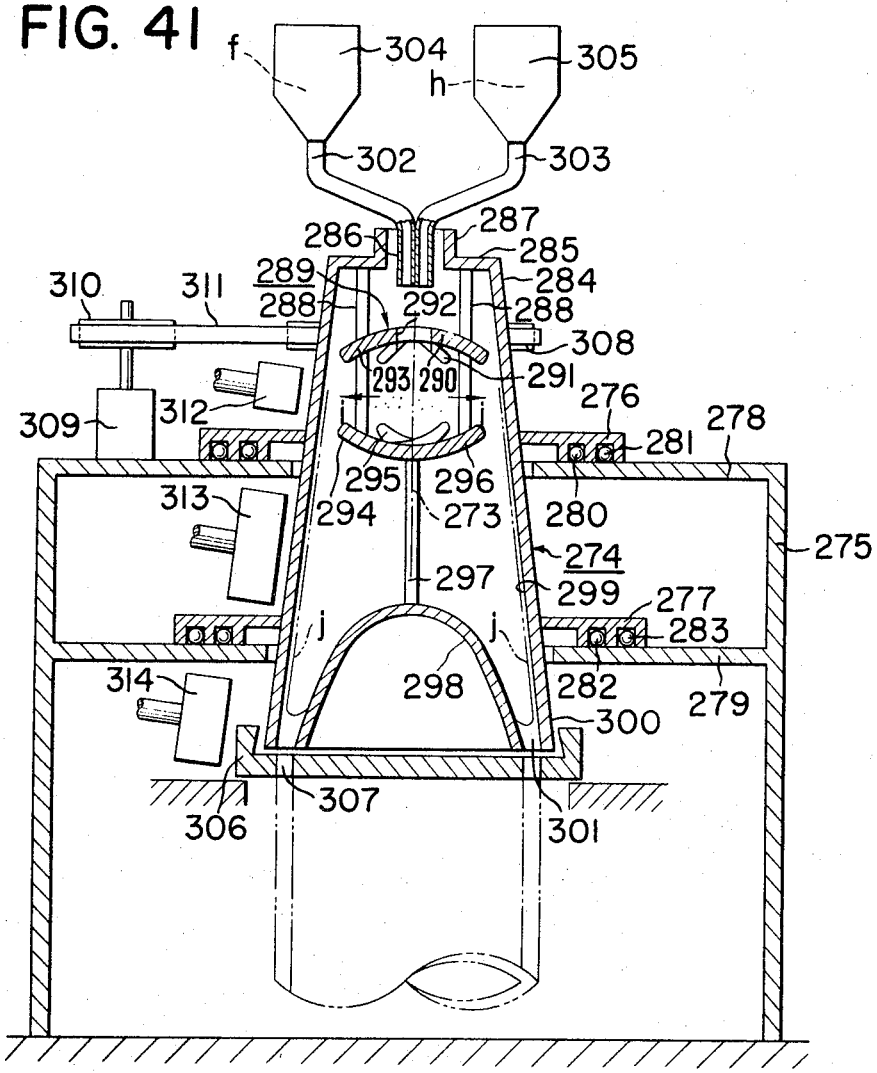
FIG. 41 is a longitudinal sectional view of the main part of a vertical rotary type plasticizing apparatus having a mixing and scattering mechanism to which a plasticizing method of the present invention is applied.
Figure 42:
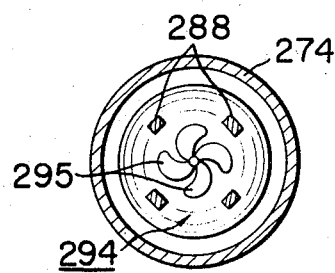
FIG. 42 is a sectional plane view of the lower portion of the mixing and scattering mechanism.
Figure 43:
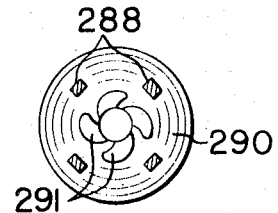
FIG. 43 is a sectional bottom view of the upper portion of the mixing and scattering mechanism.

As apparatus as shown in FIGS. 41 to 43 is a vertical rotary type plasticizing apparatus which is suitable to plasticizing thermoplastic resin while mixing the compounding material such as stabilizer into resin materials.

A rotating body 274 having a frusto-conical shape of which axial line 273 is met with the vertical line and which is rotatable around the axial line 273 is mounted on a frame 3 so as to be rotatable in the vertical direction. That is, a supporting member 276 fixed at the upper portion of the outer periphery of said rotating body 274 and a supporting member 277 fixed at the lower portion of the outer periphery thereof are respectively supported rotatably by bearings 280, 281, 282 and 283 provided on the stages 278 and 279 of the frame 275, said stages being in response to the respective supporting members 276 and 277. Further, said rotating body 274 forms a circular portion 285 at a small diameter end portion 284, and a reduced diameter portion 287 having an opening at its upper portion is provided on said circular portion 285. A mixing and scattering mechanism 289 is supported by supporting bars 288, 288 ... of which upper ends are fixed respectively at the inner face of said circular portion 285, said mixing and scattering mechanism 289 comprising a inverted cup-shaped member 290 of which periphery is fixed at each of the central portions of said supporting bars 288, 288 and of which inner surface is provided with a plurality of mixing blades 291, 291 ..., an upper portion 293 which forms an opening 292 at its central portion, a cup-shaped member 294 of which periphery is fixed at each of the lower portions of said supporting bars 288, 288, and a lower portion 296 which is provided with a plurality of mixing blades 295, 295 ... arranged so as to have the center at the central concave portion of said cup-shaped member 294. The outermost periphery of the mixing blades 291, 291 ..., 295, 295 ... is smaller than the outer periphery of each of said inverted cup-shaped member 290 and said cup-shaped member 294. The upper end of a supporting rod 297 is fixed at the center of the inner surface of said cup-shaped member 294 of the lower portion 296 and the lower end of said supporting rod 297 is fixed at the top portion of a dome-shaped member 298. The inner peripheral wall 299 of said rotating body 274 forms the outer peripheral wall of frust-cone, and a large diameter end portion 300 is opened by expanding gradually the diameter downwardly from said small diameter end portion 284. A circular discharge opening 301 is formed by said large diameter end portion 300 and the outer peripheral surface of the lower end of said inverted cup-shaped member 298.

Nextly, there are provided hoppers 304 and 305 from which conduits 302 and 303 are respectively led to an opening 286 of the reduced diameter portion 287 of the upper end of the rotating body 274, the lower ends of said conduits being directed to the opening 292 of the upper portion 293 of said mixing and scattering mechanism 289, and also a mouth piece 306 is provided so as to face the discharge opening 301 of the rotating body 274. In such case, an outlet opening 307 of said mouth piece 306 is in the annular form for extruding the cylindrical article.

The driving mechanism of the rotating body 274 is so constructed that a sprocket wheel 308 fixed at the outer periphery of the upper portion of the rotating body 274, a sprocket wheel 310 is fixed on the axis of a driving electric motor 309 is mounted on a stage 278, and a chain 311 is hung between said sprocket wheel 308 and said sprocket wheel 310 whereby the rotating body 274 is vertically rotated by operating said driving electric motor 309.

Referring to the drawings, 312, 313 and 314 are respectively heating mechanisms for heating the upper portion, central portion, and the lower portion of the rotating body 274.

The apparatus as mentioned above can be operated as follows.

By actuating the driving electric motor 309, the rotating body 274 is rotated, during which the resin material $f$ in the hopper 304 and the compounding material $h$ in the hopper 305 are charged into the rotating body 274 of a predetermined compounding ratio. In this case, since the lower ends of conduits 302 and 303 led from the hoppers 304 and 305 are directed to the opening 292 of the upper portion 293 in the mixing and scattering mechanism 289, the resin material $f$ and the compounding material $h$ are introduced into the lower portion 296 through the opening 292 and then while being mixed up well without their accumulation on the lower portion 296 by means of the mixing blades 291, 291 ..., 295, 295 ... which are rotated integrally with the rotating body 274, both of the resin material $f$ and the compounding material $h$ is scattered in the arrow direction $i$ due to a centrifugal force, namely in the radial direction making a right angle with the axial line 273 of the rotating body 274 and also is struck to the inner peripheral wall 299. Thus, the mixture of the resin material $f$ and the compounding material $h$ are rotated together with the rotating body 274 while being pressed toward said inner peripheral wall 299 due to a centrifugal force.

Since the inner peripheral wall 299 of the rotating body 274 was made the frusto-conical peripheral wall, the centrifugal force which functions to the inner peripheral wall 299 occurs the pressing force against the inner peripheral wall 299 and the press-forwarding force downward along said inner peripheral wall 299. Further, since the rotating body 274 is heated preliminarily till a predetermined temperature by the heating mechanisms 312, 313 and 314, the mixture is melted in the inner peripheral wall 299 of the rotating body 274 and then the melting material $j$ is press-forwarded downward along the inner peripheral wall 299 while it becomes film-like material having a uniform thickness-layer.

As mentioned above, the mixture of the resin material $f$ and the compounding material $h$ supplied from the hoppers 304 and 305 flows down gradually while it is melted and pressed toward the inner peripheral wall 299 of the rotating body 274, so that it is possible to uniform the compounding ratio of the resin material $f$ and the compounding material $h$ as a whole. Accordingly, the melting resin in the inner peripheral wall 299 of the rotating body 274 flows down without accumulation thereof and comes to the discharge opening 301 formed between the dome-shaped member 298 and the large diameter end portion 300. In this case, it is preferable to predetermine the largeness of the discharge opening 301 by considering the relationship between the plasticizing quantity and the plasticizing velocity due to the rotating velocity of the rotating body 274 and the dome-shaped member 298 which rotate together so that the melting resin $j$ may stay for a very short time in the discharge opening 301. In the embodiment according to this invention, the mouth piece 306 having the annular outlet opening 307 in response to the discharge opening 301, so that the melting resin $j$ flowing out from the discharge opening 301 is extruded at once through the mouth piece 306 and then is taken off by a taking-off mechanism (not shown) while it is cooled whereby the cylindrical articles can be produced.

It is preferable to rotate the rotating body 274 at such a speed that the resin material receive the centrifugal force of 5G or more in the middle portion of the rotating body.

According to the apparatus, there is provided the mixing and scattering mechanism in the side of the small diameter-end portion of the rotating body having the frust-conical inner peripheral wall, and the resin material is charged into the rotating body which is rotated while being heated and then melted in the state that they are pressed toward the inner peripheral wall of said rotating body through said mixing and scattering mechanism and thus melting materials flow down gradually along said inner peripheral wall, so that in the case of compounding a stabilizer and the like into the resin material and then plasticizing them, it is in particular suitable to mix cotton waste, asbestos, diatomaceous earth and clay into the resin material, and of course it is possible to apply to plasticization of only the resin material.

Further, according to the present apparatus, the state of plasticization of the materials is completely uniform, and in particular the breaking and distribution in part of the reinforcing materials do not occur, that is, the uniform compounding of materials can be established, which are advantageous effects for a mass-plasticization.

What is claimed is:

1. A rotary type plasticizing apparatus comprising an axially extending hollow rotatable body having its axis of rotation arranged horizontally and having a substantially frustoconically shaped inner peripheral wall surface which increases in diameter in the axial direction from a small diameter inner peripheral wall portion at one end to a large diameter inner peripheral wall portion at the opposite end so that the lower portion of said body slopes downwardly from its small diameter and to its large diameter end, means for rotating said body, a heating device for heating the contents of said hollow rotatable body, a cone shaped member coaxially positioned within said body and having its outer peripheral surfaces arranged in spaced relationship to said inner peripheral wall portion of said body and forming an annular passage between the inner peripheral wall of said body and the outer peripheral surface of said cone shaped member with the annular passage having its radial dimension decreasing in the axial direction from the small diameter end to the large diameter end of said body, connecting pieces extending between and secured to said body and cone shaped member so that said cone shaped member rotates with said body, means for feeding solid resin material into the small diameter end of said body onto the inner peripheral wall at the small diameter end thereof so that as the solid resin material is introduced into said body, it is heated and plasticized and exposed to the rotational action of said body and cone shaped member and due to the centrifugal force developed by the rotational action it is pressed against said inner peripheral wall and propelled in the axial direction of said body toward said large diameter end thereof, said body arranged to prevent the accumulation of the resin material in the vicinity of the small diameter end of said inner peripheral wall and said annular space between said body and said cone shaped member forming a vent for the removal of vapor products of the plasticization of the solid resin material from said rotatable body, a fixedly supported discharge member mounted at one end on the large diameter end of said body and extending axially outwardly therefrom and converging inwardly to an outlet opening located approximately on the extension of the axis of said body, a rotatable sealing mechanism positioned between the end of said body and the corresponding end of said discharge member, the end of said cone shaped member located adjacent the end of the large diameter end of said body combining with the inner surface of said discharge member and forming an outlet passage communicating between the annular passage between said cone shaped member and said body and the outlet opening in said discharge member for providing an angular change in the direction of movement of the plasticized resin as it leaves said body and passes into said discharge member.

2. A rotary type plasticizing apparatus, as set forth in claim 1, wherein said cone shaped member has a first conically shaped section located within said body and a second conically shaped portion located within said discharge member and said second conically shaped portion and said discharge member forming an annular passage within said discharge member extending from the annular passage in said body to the outlet opening from said discharge member, and the outer peripheral surface of said second conically shaped portion arranged to create a normal stress effect so that the discharge pressure on the plasticized resin material is increased.

3. A rotary type plasticizing apparatus, as set forth in claim 1, wherein said means for feeding solid resin material comprises a delivery screw rod arranged coaxially with the axis of said body and the outlet opening from said discharge member.

4. A rotary type plasticizing apparatus, as set forth in claim 1, including projections disposed in spaced relation on the inner peripheral wall of said body for providing a kneading effect upon the plasticized resin flowing therethrough, said projections are equidistantly spaced apart from one another and are inclined relative to the axis of said body.

5. A rotary type plasticizing apparatus, as set forth in claim 1, including a foreign material removing member positioned at the juncture of said body portion and said discharge member with said discharge member being spaced radially outwardly from the large diameter end of said body and with said foreign material removing member extending into said discharge member and being spaced between the radially outer surface of said body and the radially inner surface of said discharge member.

* * * * *

UNITED STATES PATENT OFFICE
CERTIFICATE OF CORRECTION

Patent No. 3,748,074              Dated July 24, 1973

Inventor(s) HARUO NITTA ET AL

It is certified that error appears in the above-identified patent and that said Letters Patent are hereby corrected as shown below:

In the heading of the patent, insert:

--[73] Assignee: Mitsubishi Petrochemical Company Limited, Tokyo-To, Japan--

Signed and sealed this 20th day of November 1973.

(SEAL)
Attest:

EDWARD M. FLETCHER, JR.
Attesting Officer

RENE D. TEGTMEYER
Acting Commissioner of Patents